US012176653B2

(12) United States Patent
Jushchyshyn et al.

(10) Patent No.: US 12,176,653 B2
(45) **Date of Patent: *Dec. 24, 2024**

(54) COVER AND LOCKING MEMBER FOR ELECTRICAL DEVICES

(71) Applicant: Burndy, LLC, Manchester, NH (US)

(72) Inventors: Jeremy Jushchyshyn, Willow Grove, PA (US); Michael Anthony Bucciero, Pennsauken, NJ (US); Nicholas Polidori, Medford, NJ (US)

(73) Assignee: BURNDY, LLC, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,568

(22) Filed: Sep. 25, 2023

(65) Prior Publication Data

US 2024/0030653 A1 Jan. 25, 2024

Related U.S. Application Data

(63) Continuation of application No. 17/858,902, filed on Jul. 6, 2022, now Pat. No. 11,769,967, which is a continuation of application No. 17/161,520, filed on Jan. 28, 2021, now Pat. No. 11,404,825.

(60) Provisional application No. 62/966,880, filed on Jan. 28, 2020.

(51) Int. Cl.

| | |
|---|---|
| ***H01R 13/639*** | (2006.01) |
| ***H01R 13/52*** | (2006.01) |
| ***H01R 13/53*** | (2006.01) |

(52) U.S. Cl.

CPC ....... *H01R 13/639* (2013.01); *H01R 13/5213* (2013.01); *H01R 13/53* (2013.01)

(58) Field of Classification Search

None

See application file for complete search history.

(56) References Cited

U.S. PATENT DOCUMENTS

| | | | |
|---|---|---|---|
| 2,206,653 | A | 7/1940 | Yonkers |
| 3,147,338 | A | 9/1964 | Ekvall et al. |
| 3,275,974 | A | 9/1966 | Mixon, Jr. |
| 3,491,331 | A | 1/1970 | Glader |

(Continued)

FOREIGN PATENT DOCUMENTS

| | | |
|---|---|---|
| EP | 1058343 | 12/2000 |
| FR | 2713291 | 6/1995 |

OTHER PUBLICATIONS

International Search Report and Written Opinion in corresponding International Application PCT/US2021/15560 mailed on Apr. 8, 2021 (11 pages).

(Continued)

*Primary Examiner* — Tho D Ta

(74) *Attorney, Agent, or Firm* — Wissing Miller LLP

(57) ABSTRACT

A locking member particularly adapted to lock a cover onto an electrical connector which connects an electrical transmission conductor to a distribution conductor is provided. The locking member includes a tip portion, a gripping portion, a holding portion, and a head portion, where the tip portion has a smaller cross-sectional area than the gripping portion and where the head portion is a widest portion of the locking member. The present disclosure is also directed insulating cover assemblies that include an insulating cover and a locking member contemplated by the present disclosure.

36 Claims, 21 Drawing Sheets

(56) References Cited

U.S. PATENT DOCUMENTS

| | | | | |
|---|---|---|---|---|
| 3,697,932 | A | 10/1972 | Keto et al. | |
| 3,711,138 | A | 1/1973 | Davis | |
| 4,403,895 | A | 9/1983 | Caldwell et al. | |
| 4,683,785 | A | 8/1987 | Perraudin | |
| 5,378,101 | A | 1/1995 | Olson et al. | |
| 7,341,479 | B2 | 3/2008 | Boutlin | |
| 10,465,732 | B2 | 11/2019 | Polidori | |
| 11,101,581 | B2 * | 8/2021 | Polidori | H02G 15/10 |
| 11,404,825 | B2 * | 8/2022 | Jushchyshyn | H01R 13/53 |
| 2004/0068319 | A1 | 4/2004 | Cordaro | |
| 2007/0142837 | A1 | 6/2007 | Dreyfuss | |
| 2008/0112775 | A1 | 5/2008 | Hsu | |
| 2008/0177307 | A1 | 7/2008 | Moskowitz et al. | |
| 2010/0048051 | A1 | 2/2010 | Melni | |
| 2013/0023992 | A1 | 1/2013 | Moskowitz et al. | |
| 2014/0345938 | A1 | 11/2014 | Royer | |
| 2016/0141801 | A1 | 5/2016 | Siebens et al. | |
| 2017/0033541 | A1 | 2/2017 | McCallum et al. | |
| 2018/0031795 | A1 | 2/2018 | Al Ghossein et al. | |
| 2021/0104826 | A1 | 4/2021 | Polidori et al. | |
| 2021/0376499 | A1 * | 12/2021 | Polidori | H01R 4/70 |

OTHER PUBLICATIONS

International Preliminary Report on Patentability in corresponding International Application PCT/US2021/15560 mailed on Aug. 11, 2022 (9 pages).

* cited by examiner

COVER AND LOCKING MEMBER FOR ELECTRICAL DEVICES

CROSS REFERENCE TO RELATED APPLICATIONS

This application is a continuation of application Ser. No. 17/858,902 filed on Jul. 6, 2022, which is a continuation of application Ser. No. 17/161,520 filed on Jan. 28, 2021, and claims benefit from U.S. Provisional Patent Application Ser. No. 62/966,880 filed on Jan. 28, 2020 the entire contents of each are incorporated herein by reference.

BACKGROUND

Field

The present disclosure relates to insulating covers for high voltage electrical devices and to locking members for locking such covers over high voltage electrical devices.

Description of the Related Art

Electrical distribution systems, especially high voltage electrical distribution systems, often require having an electrical main conductor and a tap conductor. The tap conductor may draw away some of the current from the electrical main conductor or it may feed current onto the electrical main conductor. Such operation requires an electrical connector to connect the main conductor to the tap conductor. Because of the high voltages and associated safety issues, it is desirable that such electrical connectors be covered with an insulating cover. It may also be desirable to have a way to lock the cover so that it stays on the electrical connector even during certain inclement weather conditions. Thus, there is a need for a locking member which is easy to use and does not require an operator to be too close to the insulating cover in order to operate the locking member.

SUMMARY

The present disclosure provides embodiments of locking members used to lock insulating covers on high voltage electrical connectors and to insulating covers that include such locking members. In one exemplary embodiment, the locking member includes a high pitch threading allowing the cover material to fall in-between the threads. The helical threads gradually turn into a vertical wall acting as a stop or barrier. This prevents the unwanted opening and closing of the cover/enclosure without significant force. In another exemplary embodiment, the locking member includes a shaft having a tip portion, a grip portion and a holding portion. The tip portion has a smaller cross-sectional area than a cross-sectional area of the grip portion. The locking member also includes a head portion at an end of the shaft. The head portion is used to rotate the shaft.

In another exemplary embodiment, the locking member includes a shaft and a head portion. The shaft has a first outside diameter, and includes a tip portion, a gripping portion and a holding portion. The tip portion has at least a portion forming a second outside diameter on the shaft wherein the second outside diameter is larger than the first outside diameter of the shaft. The gripping portion is adjacent the tip portion, and has a first end, a second end and a spiral shaped flange wrapped around the shaft and extending from the first end to the second end of the shaft. The spiral shaped flange may be a continuous helix-like structure or a plurality of helix-like structures joined in series on the shaft. The outer diameter of the spiral flange may gradually increase along a length of the gripping portion of the shaft. For example, the first end of the gripping portion may have the smallest outer diameter and the second end of the gripping portion may have the largest diameter. The holding portion is adjacent the grip portion. The holding portion has a first end starting at an outer surface of the second end of the gripping portion and a second end. The first end and the second end of the holding portion are configured to contact the cover when the cover is covering a high voltage electrical connector. Preferably, the portion of the shaft within the holding portion has a smooth outer surface. The head portion of the locking member is positioned at an end of the shaft adjacent the holding portion. The head portion has tool mounting member used for rotating the shaft. In an exemplary embodiment, the tool mounting member is a ring-like member or an eyelet.

The present disclosure also provides exemplary embodiments of a cover system for high-voltage electrical connectors. In one exemplary embodiment, the cover system includes an insulating cover and a locking member. The locking member includes a tip portion, a grip portion and a holding portion associated with a shaft. The tip portion has a smaller cross-sectional area than a cross-sectional area of the grip portion. The locking member also includes a head portion at an end of the shaft. The head portion is used to rotate the shaft.

In another exemplary embodiment, the cover system includes an insulating cover and a locking member. The insulating cover has a first cover portion and a second cover portion, where the cover portions are movable between an open position and a closed position. The first cover portion has a first locking aperture, and the second cover portion has a second locking aperture, where the second locking aperture aligns with the first locking aperture when the cover is in the closed position. The locking member includes a shaft and a head portion. The shaft has a first outside diameter, and includes a tip portion, a gripping portion and a holding portion. The tip portion has at least a portion forming a second outside diameter on the shaft wherein the second outside diameter is larger than the first outside diameter of the shaft. The gripping portion is adjacent the tip portion, and has a first end, a second end and a spiral shaped flange wrapped around the shaft and extending from the first end to the second end of the shaft. The spiral shaped flange may be a continuous helix-like structure or a plurality of helix-like structures joined in series on the shaft. The outer diameter of the spiral flange may gradually increase along a length of the gripping portion of the shaft. For example, the first end of the gripping portion may have the smallest outer diameter and the second end of the gripping portion may have the largest diameter. The holding portion is adjacent the grip portion. The holding portion has a first end starting at an outer surface of the second end of the gripping portion and a second end. The first end and the second end of the holding portion are configured to contact the cover when the cover is covering a high voltage electrical connector. Preferably, the portion of the shaft within the holding portion has a smooth outer surface. The head portion of the locking member is positioned at an end of the shaft adjacent the holding portion. The head portion has tool mounting member used for rotating the shaft. In an exemplary embodiment, the tool mounting member is a ring-like member or an eyelet.

In another exemplary embodiment, the cover system includes an insulating cover and a locking member. The insulating cover has a first cover portion joined to a second cover portion by a hinge. The cover portions are movable about the hinge, e.g., a living hinge, between an open position and a closed position. The first cover portion has a first locking aperture and the second cover portion having a second locking aperture where the second locking aperture aligns with the first locking aperture when the cover is in the closed position. The locking member is interactive with first cover portion and the second cover portion to releasably lock the first cover portion to the second cover portion when the cover is in the closed position. The locking member includes a shaft and a head portion. The shaft has a first outside diameter, and includes a tip portion, a gripping portion and a holding portion. The tip portion has at least a portion forming a second outside diameter on the shaft wherein the second outside diameter is larger than the first outside diameter of the shaft. The gripping portion is adjacent the tip portion, and has a first end, a second end and a spiral shaped flange wrapped around the shaft and extending from the first end to the second end of the shaft. The spiral shaped flange may be a continuous helix-like structure or a plurality of helix-like structures joined in series on the shaft. The outer diameter of the spiral flange may gradually increase along a length of the gripping portion of the shaft. For example, the first end of the gripping portion may have the smallest outer diameter and the second end of the gripping portion may have the largest diameter. The holding portion is adjacent the grip portion. The holding portion has a first end starting at an outer surface of the second end of the gripping portion and a second end. The first end and the second end of the holding portion are configured to contact the cover when the cover is covering a high voltage electrical connector. Preferably, the portion of the shaft within the holding portion has a smooth outer surface. The head portion of the locking member is positioned at an end of the shaft adjacent the holding portion. The head portion has tool mounting member used for rotating the shaft. In an exemplary embodiment, the tool mounting member is a ring-like member or an eyelet.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides embodiments of locking members that can be used to lock removable insulating covers into high voltage electrical connectors, and to cover assemblies for high voltage electrical devices that include the locking members. The present disclosure also provides embodiments of insulating cover assemblies that include insulating covers and the locking members. In the present disclosure, the high voltage electrical devices include electrical connectors that electrically connect two electrical conductors, such as a main conductor and a tap conductor, or primary distribution conductors to secondary distribution conductors. The high voltage electrical devices are typically capable of operating at voltages ranging from about 600 volts to about 110 kilovolts. Examples of common voltages at which such electrical devices may operate include at least 66 kilovolts and at least 110 kilovolts. Such electrical devices can operate at currents ranging from about 100 amps to about 1500 amps under normal operating conditions. Examples of common currents at which such electrical devices may operate include at least 1000 amps and at least 1500 amps. For ease of description, high voltage electrical devices may also be referred to herein as the "devices" or the "connectors" in the plural and the "device" or "connector" in the singular. The electrical conductors may also be referred to herein as the "conductors" in the plural and the "conductor" in the singular. The removable insulating covers may also be referred to herein as the "covers" in the plural and the "cover" in the singular. The insulating cover assemblies may also be referred to herein as the "cover assemblies" in the plural and the "cover assembly" in the singular.

Figure 1:
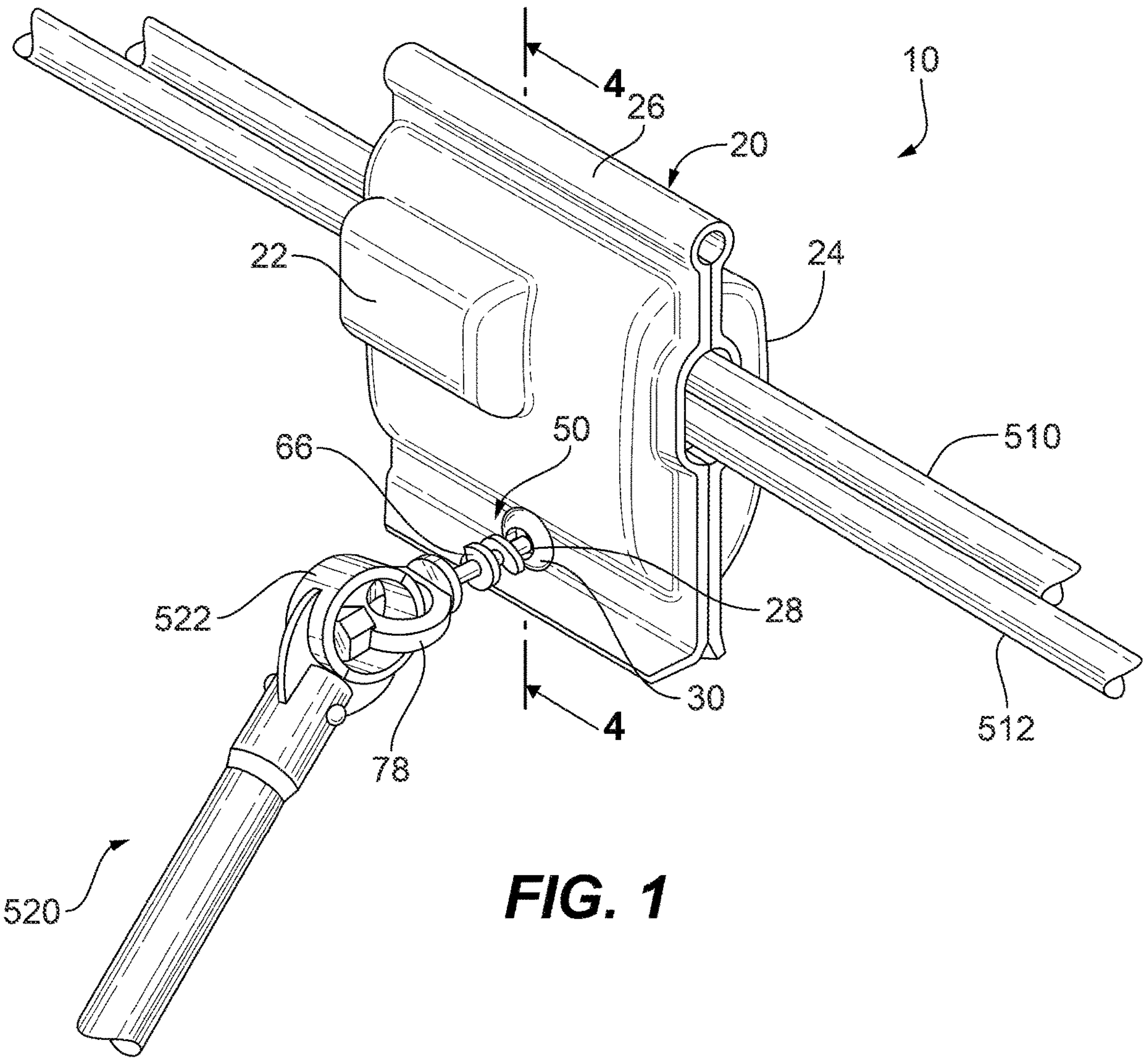
FIG. 1 is a side perspective view of an exemplary embodiment of an insulating cover assembly according to the present disclosure in use, illustrating an insulating cover covering a high voltage electrical device, a transmission conductor and a distribution conductor passing into the insulating cover, and a locking member according to the present disclosure being connected to the insulating cover with an extendable reach tool.
Figure 2:
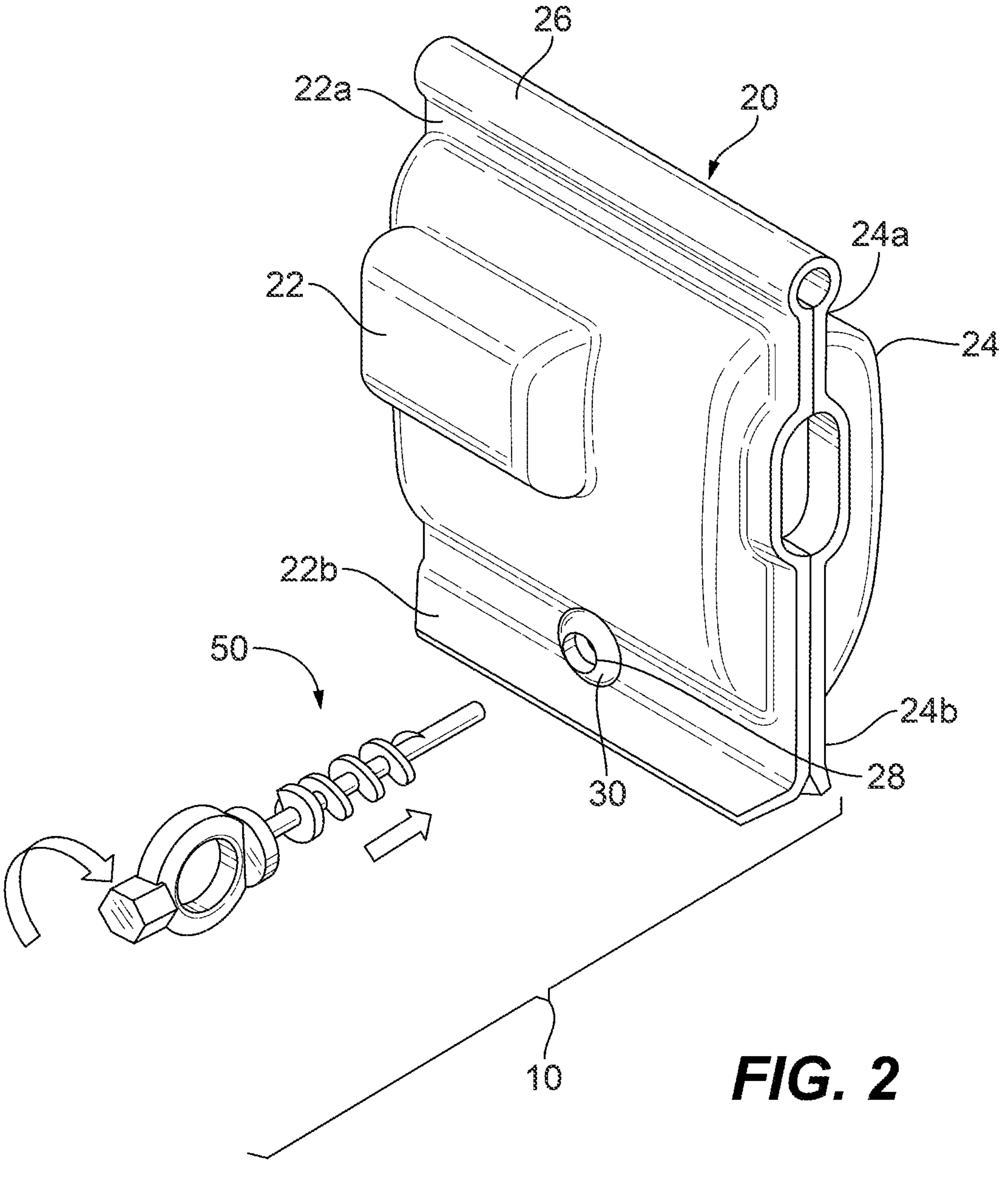
FIG. 2 is a side perspective view of the insulating cover assembly of FIG. 1 with the locking member separated from the insulating cover and the insulating cover in a closed position.
Figure 3:
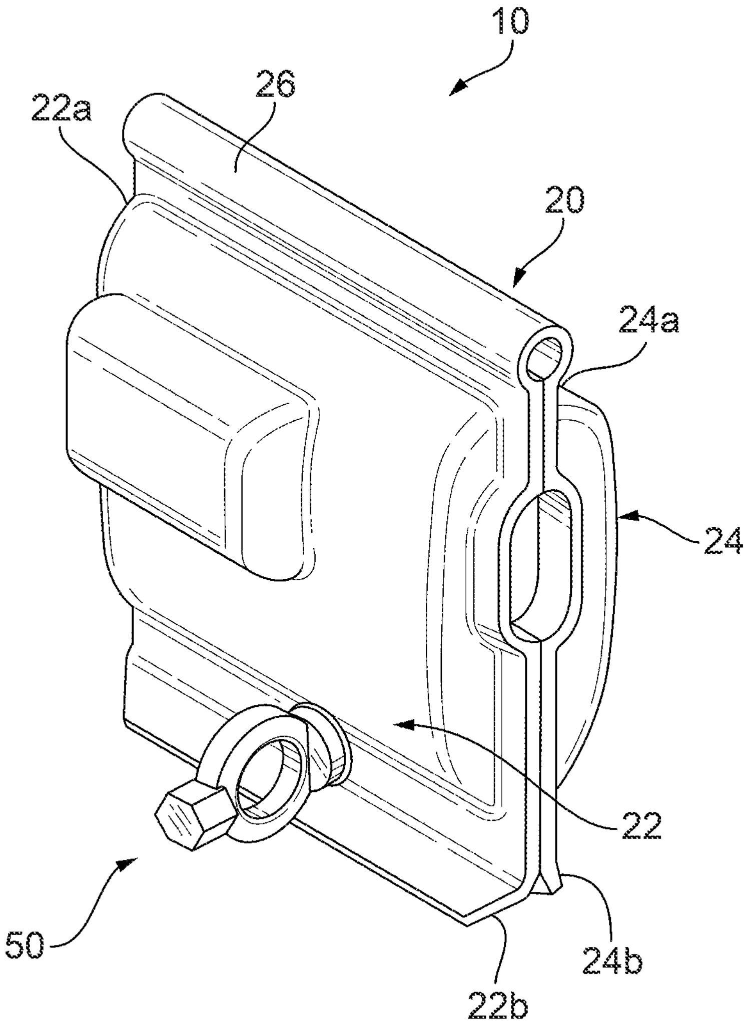
FIG. 3 is a side perspective view of the insulating cover assembly of FIG. 2 with the locking member positioned within locking apertures in the insulating cover and locking the insulating cover in the closed position.

Referring now to the drawings, wherein like reference numerals have been used throughout the various figures to designate like elements, there is shown exemplary embodiments of cover assemblies and locking members according to the present disclosure. An exemplary embodiment of a cover assembly 10 according to the present disclosure is shown in FIGS. 1-3. The cover assembly 10 includes a cover 20 and locking member 50. The locking member 50 is used to lock the cover 20 onto an electrical device 500, seen in FIGS. 4A and 4B, to cover the electrical device 500 and a portion of one or more conductors 510 and 512 connected to the electrical device 500. The locking member 50 may be secured to the cover 20 by hand or using an extendable reach tool 520, such as a hot-stick seen in FIG. 1.

Referring to FIGS. 2-4B, the cover 20 includes a first cover body 22 and a second cover body 24. In the embodiment shown, the first cover body 22 has one end 22*a* joined to a hinge 26 and a free end 22*b*. At least a portion of the free end 22*b* of the first cover body 22 may be angled to form a lead-in that makes it easier for the cover 20 to pass over the electrical device 500 and conductors 510 and 512 when installed. Similarly, the second cover body 24 has one end 24*a* joined to the hinge 26 and a free end 24*b*. At least a portion of the free end 24*b* of the second cover body 24 may be angled to form a lead-in that also makes it easier for the cover 20 to pass over the electrical device 500 and conductors 510 and 512 when installed. The hinge 26 permits the first cover body 22 and the second cover body 24 to move between an open position, seen in FIG. 4A and a closed position, seen in FIG. 4B. The hinge 26 may be for example a living hinge.

Figure 4A:
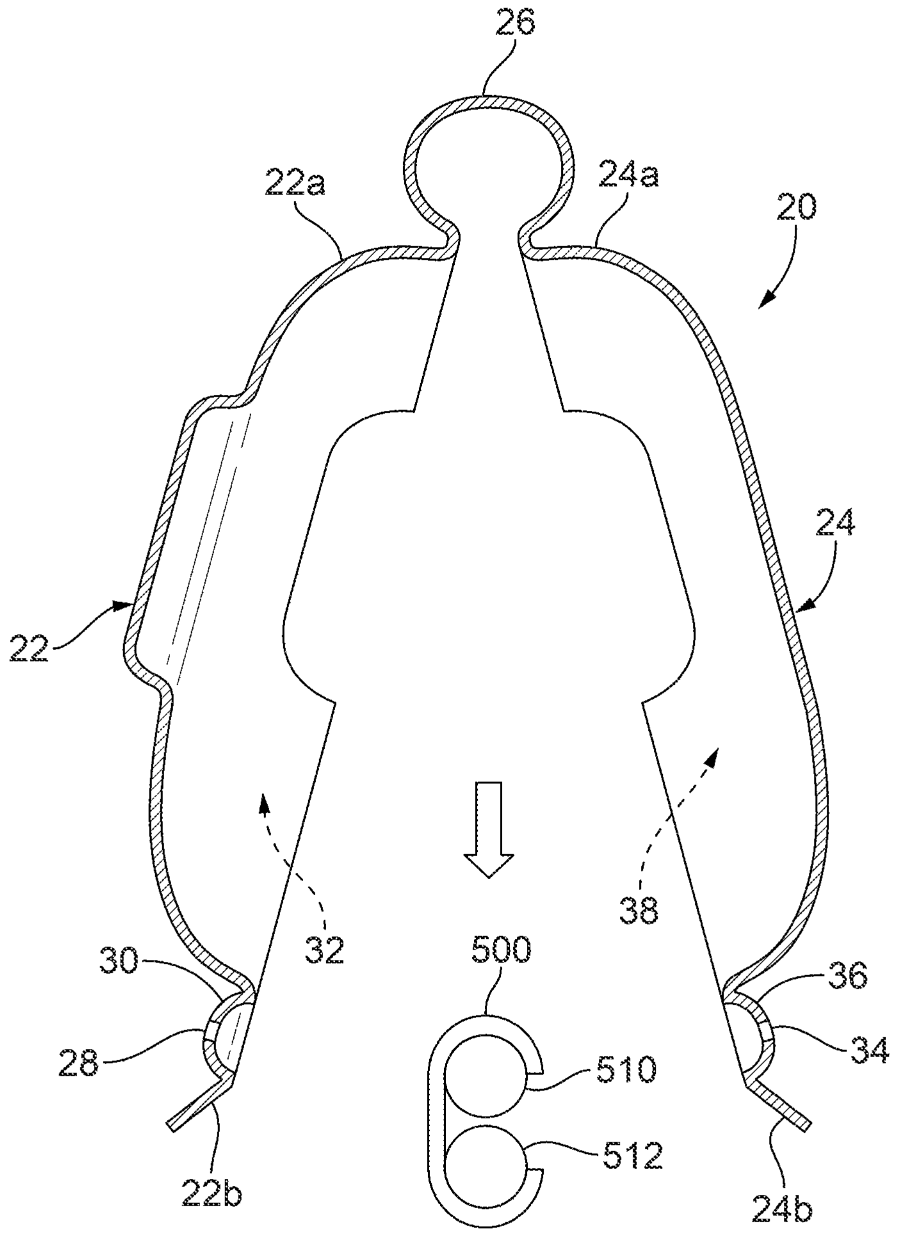
FIG. 4A is a cross-sectional view of the insulating cover assembly of FIG. 1 without the locking member and taken from line 4-4, illustrating the insulating cover in an open position and being positioned for installation on an electrical device and electrical conductors.
Figure 4B:
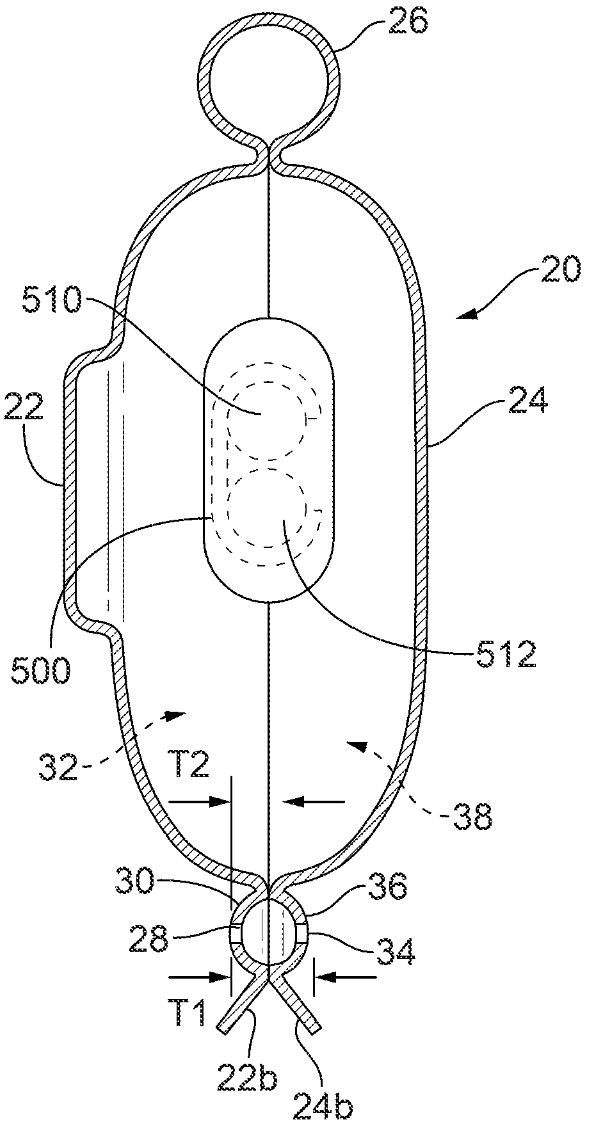
FIG. 4B is a cross-sectional view of the insulating cover assembly of FIG. 1 without the locking member and taken from line 4-4, illustrating the electrical conductors and the electrical device within the insulating cover and the insulating cover in the closed position.

In the exemplary embodiment shown in FIGS. 4A and 4B, the first cover body 22 includes one or more locking apertures 28 positioned in close proximity to the free end 22*b* of the first cover body 22. The one or more locking apertures 28 are used when locking the first cover body 22 of the cover 20 to the second cover body 24 described in more detail below. Each of the one or more locking apertures 28 may include a raised surface or protrusion 30 that extends on the first cover body 22 substantially around the locking aperture 28 as shown. The raised surface 30 acts as a Belleville washer to apply pressure to the first cover body 22 when the locking member 50 locks the first cover body 22 to the second cover body 24 described in more detail below. The first cover body 22 also includes a cavity 32 configured and dimensioned to receive the device 500 and the conductors 510 and 512 as shown in FIGS. 4A and 4B. Similarly, the second cover body 24 includes one or more locking apertures 34 positioned in close proximity to the free end 24*b* of the second cover body 24. The one or more locking apertures 34 are used when locking the first cover body 22 of the cover 20 to the second cover body 24 as described below. Each of the one or more locking apertures 34 may include a raised surface or protrusion 36 that extends on the second cover body 24 substantially around the locking aperture 34 as shown. The raised surface 36 acts as a Belleville washer to apply pressure to the second cover body 24 when the locking member 50 locks the first cover body 22 to the second cover body 24. The second cover body 24 also includes a cavity 38 configured and dimensioned to receive the device 500 and the conductors 510 and 512 as shown in FIGS. 4A and 4B. It is noted that the cavity 32 in the first cover body 22 and the cavity 38 in the second cover body 24 may form a larger combined cavity when the first cover body 22 is locked to the second cover body 24.

Figure 12A:
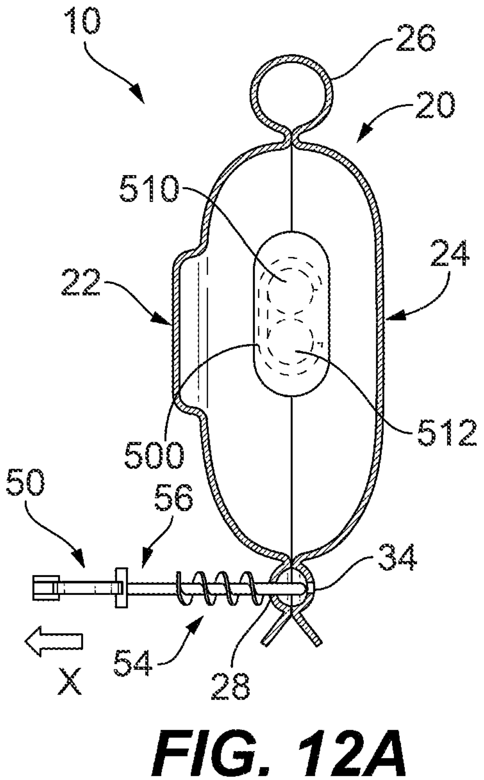
FIG. 12A is the cross-sectional view of FIG. 4B, illustrating a tip portion of the locking member being inserted into locking apertures in the insulating cover.

Referring now to FIGS. 5-11, an exemplary embodiment of a locking member 50 according to the present disclosure is shown. The locking member 50 is configured and dimensioned to lock the first cover body 22 of the cover 20 to the second cover body 24 when installed. In the exemplary embodiment shown, the locking member 50 includes a tip portion 52, a gripping portion 54, a holding portion 56 and a head portion 58, seen in FIG. 7. Extending through the tip portion 52, the gripping portion 54 and the holding portion 56 is an axial portion or shaft 60. The shaft 60 has a longitudinal axis "A," seen in FIG. 9, and an outer diameter "D1," seen in FIG. 8, that is configured to fit within the locking apertures 28 and 34, seen in FIGS. 4A, 4B, and 12A in the cover 20. The diameter "D1" may be in the range of, for example, about 0.25 inches and about 0.500 inches. In the exemplary embodiment shown in FIG. 7, the tip portion 52 includes a portion of the shaft 60 from a tip 60*a* of the shaft 60 and ending at the beginning of the gripping portion 54. The length "L1" of the shaft 60 forming the tip portion 52 is configured and dimensioned to extend through at least one of the locking apertures 28 or 34 in the cover 20 before the gripping portion 54 engages the locking apertures 28 and/or 34, as seen in FIG. 12A. As a non-limiting example, the length "L1" of the shaft 60 forming the tip portion 52 may range from about 1/16 of an inch to about 2 inches.

Figure 7:
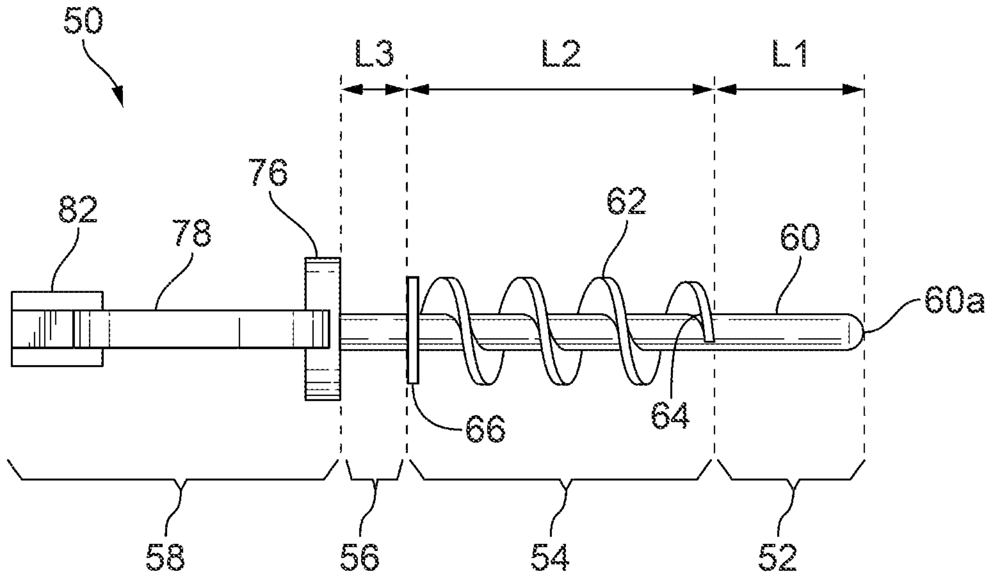
FIG. 7 is a first side elevation view of the locking member of FIG. 5.

Continuing to refer to FIGS. 5-11, the gripping portion 54 of the locking member 50 includes a spiral shaped flange 62, e.g., a continuous helix, wrapped around a portion of the shaft 60. The gripping portion 54 has a first end 64 and a second end 66. The first end 64 of the gripping portion 54 is positioned on the shaft 60 at the end of the tip portion 52, and the second end 66 is positioned on the shaft 60 a predefined distance "L2" from the first end 64, as seen in FIG. 7. The predefined distance "L2" of the gripping portion 54 depends upon a number of factors, including a thickness "T1" of the of the combination of the first cover body 22 and the second cover body 24 in the area of the locking apertures 28 and 34, seen in FIG. 4B, and a pitch "P1" of each single helix-like structure of the spiral shape flange 62, seen in FIG. 6. As a non-limiting example, the distance "L2" may range from about 0.25 inches to about 5 inches. The gripping portion 54 has an outer diameter "D2," seen in FIG. 8, that is larger than the diameter "D1" of the shaft 60 so that the spiral shaped flange 62 can be threaded into the locking apertures 28 and 34 in the cover 20, seen in FIG. 12B. The diameter "D2" includes the diameter "D1" of the shaft 60 plus the width of the spiral shaped flange 62 attached to the shaft 60, and may be, for example, in the range of about 0.5 inches to about 2 inches.

Figure 5:
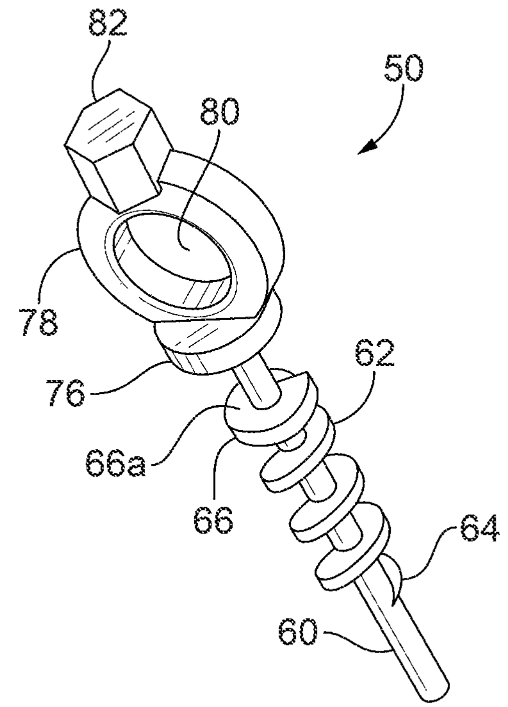
FIG. 5 is a perspective view of an exemplary embodiment of a locking member according to the present disclosure.
Figure 6:
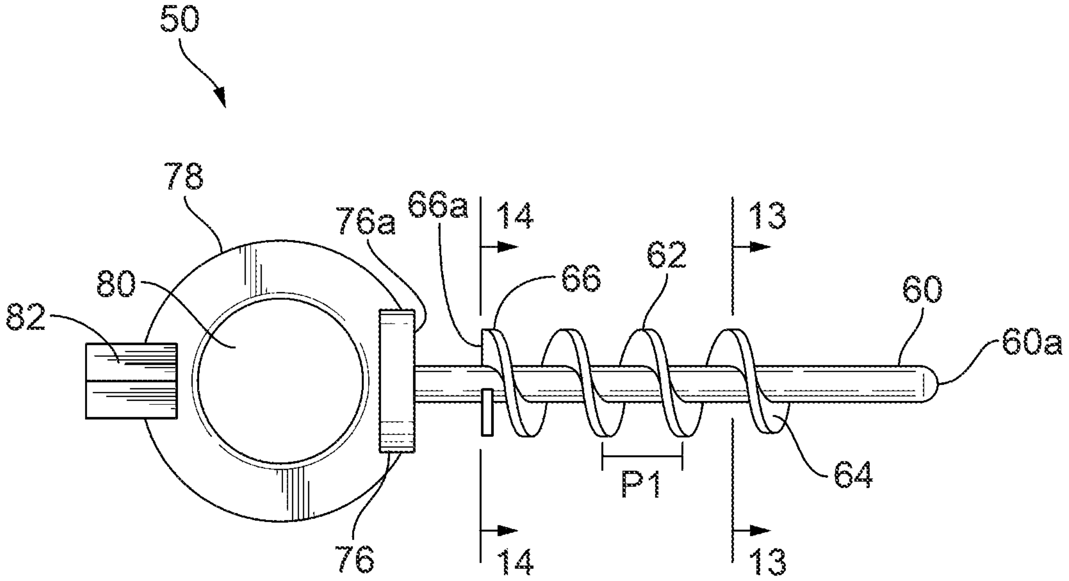
FIG. 6 is a first plan view of the locking member of FIG. 5.
Figure 13:
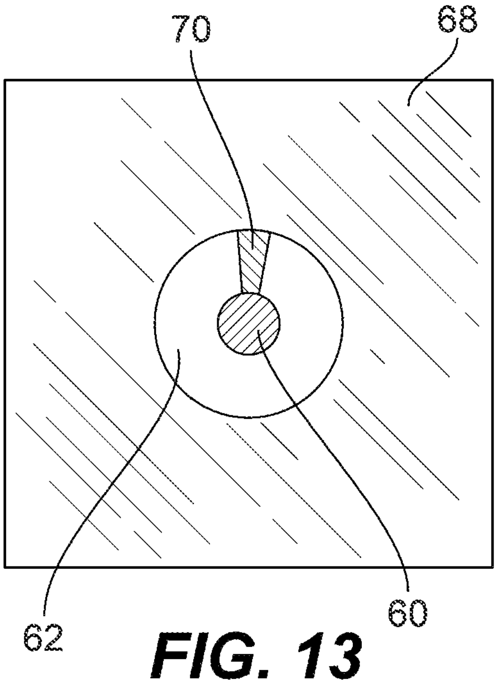
FIG. 13 is a cross-sectional view of the locking member of FIG. 6 taken from line 13-13, illustrating a plane extending perpendicular to and through the locking member.
Figure 14:
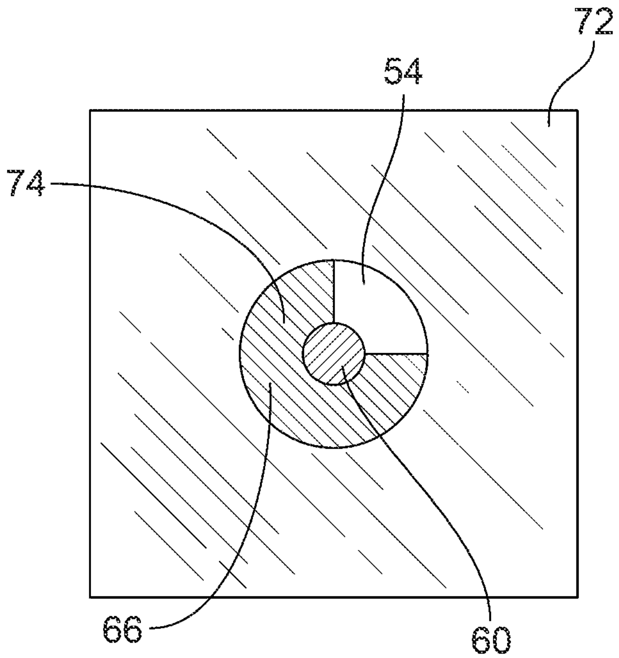
FIG. 14 is a cross-sectional view of the locking member of FIG. 6 taken from line 14-14, illustrating a plane extending perpendicular to and through a second end of the locking member.
Figure 15:
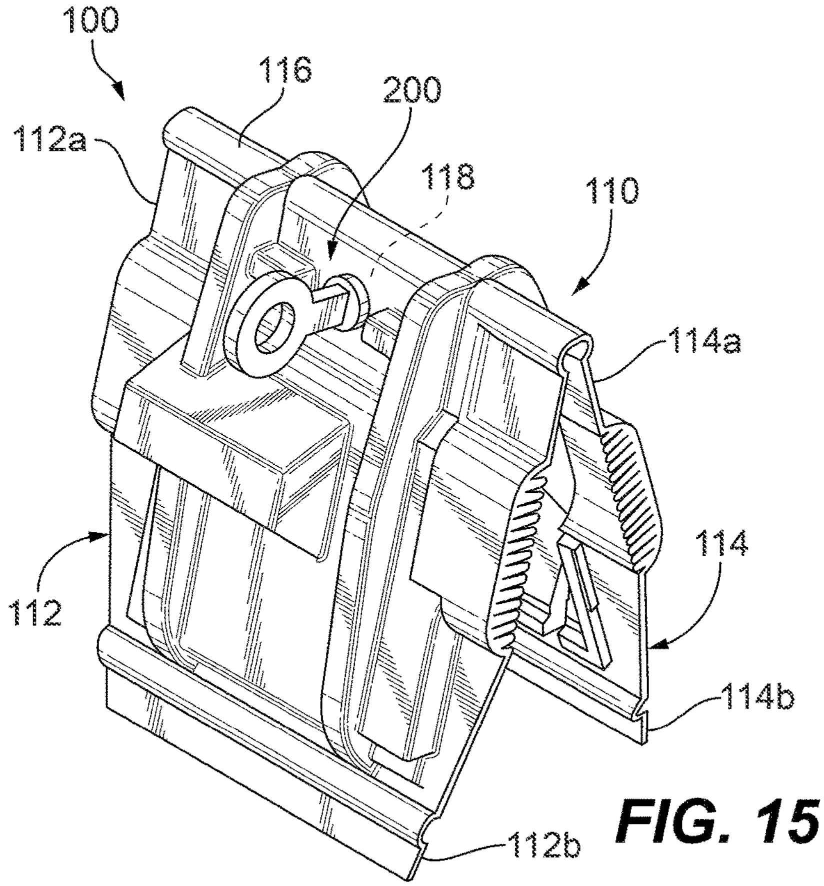
FIG. 15 is a side perspective view of another exemplary embodiment of an insulating cover assembly according to the present disclosure, illustrating another exemplary embodiment of an insulating cover and the locking member of FIG. 23 with the insulating cover in an open position.
Figure 16:
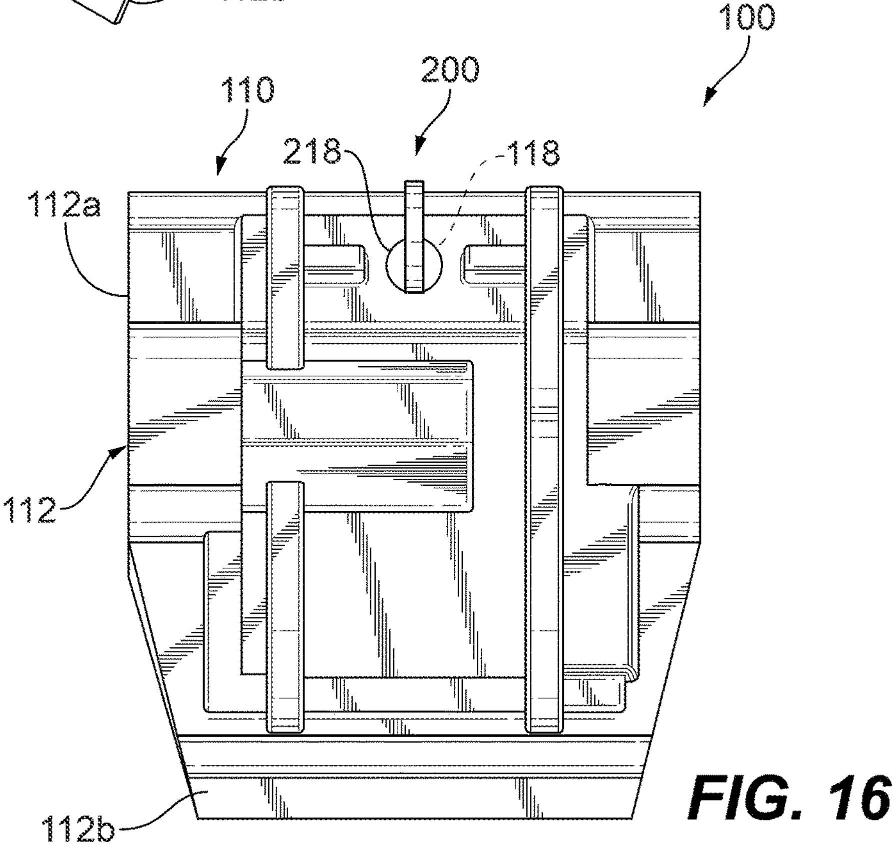
FIG. 16 is a side elevation view of the insulating cover assembly of FIG. 15.

Preferably, the spiral shaped flange 62 makes at least one complete turn around an outer surface of the shaft 60 as shown in FIG. 5. The spiral shaped flange 62 continuously extends along the shaft 60 from the first end 64 to the second end 66, such that any plane perpendicular to the shaft 60 within the gripping portion 54 intersects the spiral shaped flange 62 at less than a 30 degree extension along the outer surface of the shaft 60. However, at the second end 66 of the gripping portion 54, the plane perpendicular to the shaft 60 intersects the spiral shaped flange 62 at more than a 30 degree extension along the outer surface of the shaft 60. For example, FIG. 13 shows a plane 68 perpendicular to the shaft 60 that can intersect the spiral shaped flange 62 at any point along the gripping portion 54 except for at the second end 66. As shown, the plane 68 intersects the spiral shaped flange 62 at less than a 30 degree extension along an outer surface of the shaft 60. The reference numeral 70, seen in FIG. 13, is used to denote the intersection between the plane 68 and the spiral shaped flange 62 along the outer surface of the shaft 60. As another example, FIG. 14 shows a plane 72 perpendicular to the shaft 60 which intersects the second end 66 of the gripping portion 54. As shown, the plane 72 intersects the second end 66 of the gripping portion 54 at more than a 30 degree extension along the outer surface of the shaft 60. The reference numeral 74, seen in FIG. 14, is used to denote the intersection between the plane 72 and the second end 66 of the gripping portion 54 along the outer surface of the shaft 60. As shown in FIG. 14, the second end 66 and the intersection 74 are substantially coextensive.

It is noted that the distance or pitch "P1" (seen in FIG. 6) between a leading edge of an individual helix and a trailing edge of the individual helix forming a portion of the spiral shaped flange 62 along the shaft 60 is preferably larger than the thickness "T2" of the first cover body 22 in the area of the locking apertures 28, seen in FIG. 4B. Having the distance "P1" larger than the thickness "T2" allows the first cover body 22 in the area of the locking apertures 28 to move along the spiral shaped flange 62 when locking the cover 20. As a non-limiting example, the distance "P1" is between about 200% and about 400% of the thickness "T2" of the first cover body 22 in the area of the locking apertures 28. As another non-limiting example, the distance "P1" may be between about 0.5 in. and about 1 in.

Figure 9:
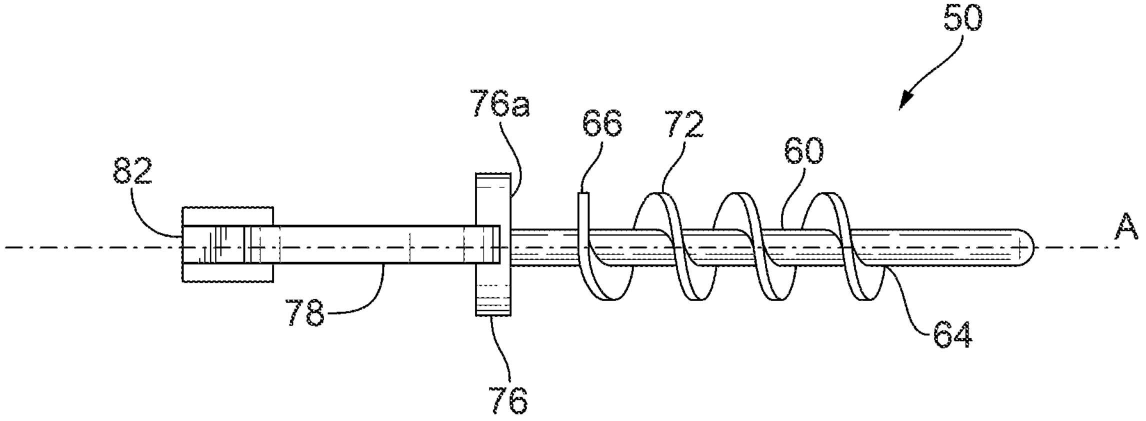
FIG. 9 is a second side elevation view of the locking member of FIG. 5.
Figure 10:
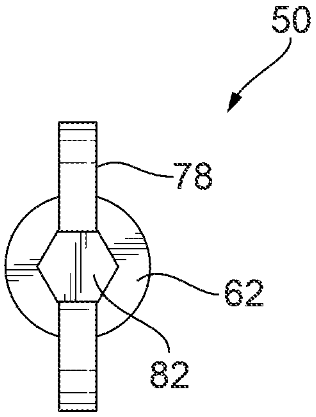
FIG. 10 is a head end elevation view of the locking member of FIG. 5.
Figure 11:
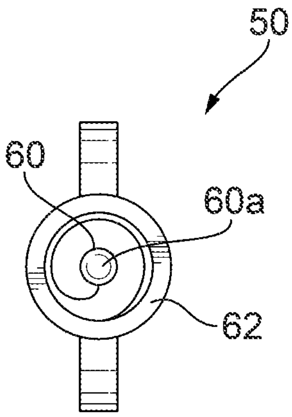
FIG. 11 is a tip end elevation view of the locking member of FIG. 5.

The second end 66 of the gripping member 54 has an outer surface 66*a* with a substantial portion that extends in a direction substantially perpendicular to the longitudinal axis "A", seen in FIG. 9, of the shaft 60. In other words, a substantial portion of the outer surface 66*a* of the second end 66 extends in a direction substantially perpendicular to the longitudinal axis "A" of the shaft 60 such that the outer surface 66*a* is substantially flat. By having an outer surface 66*a* that is substantially flat, the second end 66 is prevented from re-engaging the cover 20 once the cover is within the holding portion 56. Preventing the second end 66 from re-engaging the cover 20 maintains the cover 20 in the holding portion 56 thus locking the cover 20 in the closed position. To remove the locking member 50 from the cover 20 and thus unlock the cover, either the locking member 50 or the cover 20 would have to be broken or deformed in such a way so that the locking member 50 can be removed from the locking apertures 28 and/or 34 in the cover 20. As a result, the locking member 50 makes it difficult to tamper with the cover 20 and permits the cover to resist certain inclement weather conditions, e.g., high winds, since there is no simple way to remove the cover 20 from the electrical device 500 once the cover 20 is locked in place in the holding portion 56 by the locking member 50. The locking member 50 also limits and possibly prevents over-tightening when locking the cover 20. More specifically, when the cover 20 is within the holding portion 56 of the locking member 50, the locking member rotates freely so that the cover 20 no longer moves along the gripping member 54.

Figure 12B:
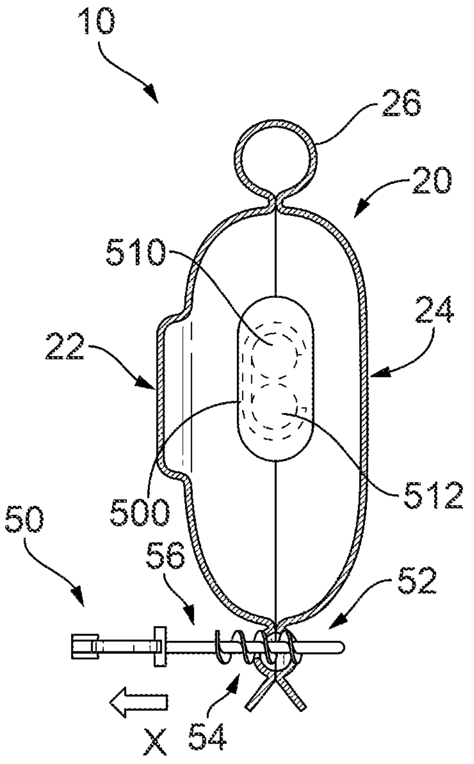
FIG. 12B is the cross-sectional view of FIG. 12A, illustrating a gripping portion of the locking member inserted into the locking apertures in the insulating cover causing the insulating cover to move along the gripping portion in a first direction.

As noted above, the first end 64 of the gripping portion 54 is configured to engage the cover 20 and to guide the movement of the cover 20 along the longitudinal axis "A" of the shaft 60 in a first longitudinal direction, identified as arrow "X" in FIGS. 12A and 12B. Movement of the cover 20 in the first longitudinal direction begins at the first end 64 of the gripping portion 54, past the second end 66 until the cover 20 enters the holding portion 56.

Figure 12C:
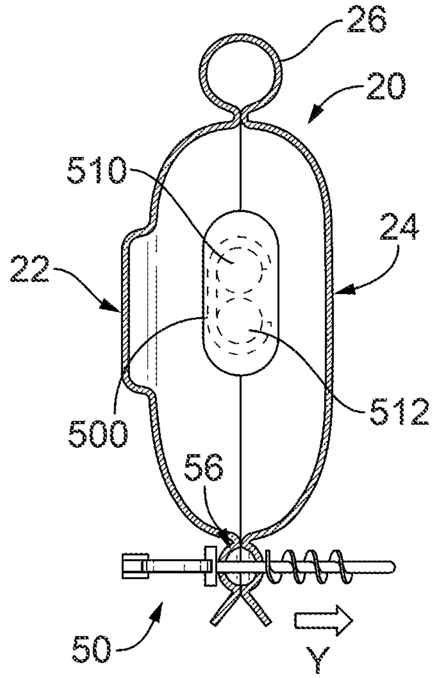
FIG. 12C is the cross-sectional view of FIG. 12B, illustrating the insulating cover within a holding portion of the locking member.

Referring to FIG. 7, the holding portion 56 includes a portion of the shaft 60 from the second end 66 of the gripping portion 54 to a head member 76 of the head portion 58 of the locking member 50. The length "L3" of the shaft 60 forming the holding portion 56 is configured and dimensioned to receive a portion of the first cover body 22 surrounding the locking aperture 28 and a portion of the second cover body 24 surrounding the locking aperture 34. More specifically, the length "L3" of the holding portion 56 is dimensioned so that it is approximately the same length as the thickness "T1" of the combination of the first cover body 22 and the second cover body 24 in the area of the locking apertures 28 and 34, seen in FIG. 4B. By having the length "L3" approximately the same length as the thickness "T1" the cover 20 is held tight within the holding portion 56 of the locking member 50 when the cover 20 is installed. However, it is also possible for the length "L3" of the holding portion 56 to be a slightly smaller than the thickness "T1" (e.g., up to about fifteen percent) such that when the cover 20 is within the holding portion 56 pressure is applied by the second end 66 of the gripping portion 54 and the head member 76 of the head portion 58 to the cover 20 causing the cover 20 to slightly be deformed within the holding portion 56. As a non-limiting example, the length "L3" of the shaft 60 forming the holding portion 56 may range from about 0.1 inches and about 0.5 inches. The second end 66 of the gripping portion 54 has an outside surface 66*a* that forms one end of the holding portion 56 and is configured to contact the cover 20 when the cover 20 is in the holding portion 56. The outside surface 66*a* is used to stop or prevent the cover 20 from moving in a second longitudinal direction, which is identified as arrow "Y" in FIG. 12C, along the shaft 60. In the exemplary embodiment shown, the second longitudinal direction is opposite to the first longitudinal direction.

Continuing to refer to FIGS. 5-11, the head portion 58 of the locking member 50 includes the head member 76 that is at the end of the shaft 60. The head member 76 may be integrally or monolithically formed to the end of the shaft 60 or the head member 76 may be attached to the shaft 60 using for example, welded joints or adhesives. The head member 76 has an outer diameter "D3" that is greater than or equal to the diameter "D2." The outer diameter "D3" of the head member 76 may be, for example, in the range of about ¾ of an inch to about 2 inches. The head member 76 has an outside surface 76*a* that forms a second end of the holding portion 56 and is configured to contact the cover 20 when the cover is within the holding portion 56. The outside surface 76*a* of the head member 76 is used to stop or prevent the cover 20 from moving in the first longitudinal direction along the shaft 60 while locking the cover 20.

Figure 8:
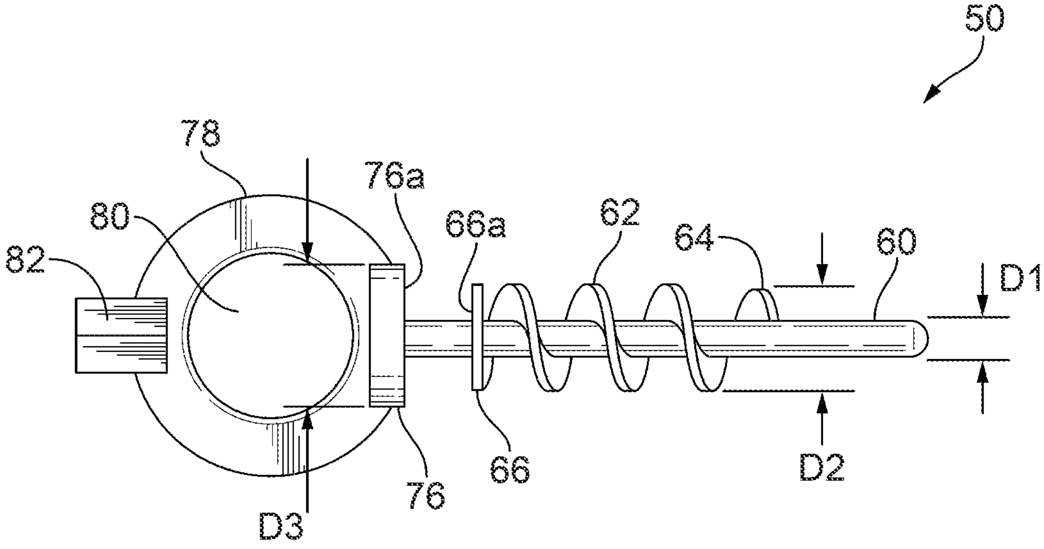
FIG. 8 is a second plan view of the locking member of FIG. 5.

The head member 76 of the head portion 58 has a tool mounting member 78 extending in a direction away from the holding portion 56, as seen in FIG. 8. The tool mounting member 78 may be integrally or monolithically formed into the head member 76 or secured to the head member 76 using welded joints or adhesives. In the exemplary embodiment shown, the tool mounting member 78 is a ring-like member having a central opening 80 through which jaws or fingers 522 of the extendible reach tool 520, seen in FIG. 1, may engage the tool mounting member 78. The extendible reach tool 520 can then be used to rotate the locking member 50 when installing the cover assembly 10. The opening 80 in the tool mounting member 78 may have a circular shape, an oval shape, a quadrilateral shape or any other shape that permits the extendible reach tool 520 to engage the tool mounting member 78. Extending from the tool mounting member 78 may be an optional tool adapter 82 that allows for the installation of the locking member 50 with a standard socket or hand tool. The tool adapter 82 may be in the form of a hex head, as shown, or the tool adapter 82 may be in any form that permits a tool or gloved hand to assist with the installation of the locking member 50.

The installation of the cover assembly 10 of FIGS. 1-4 will be described using one or more extendible reach tools 520. To install the cover assembly 10, the first cover body 22 and the second cover body 24 of the cover 20 are initially set in the open position, seen in FIG. 4A. The open cover 20 is then attached to an extendible reach tool 520 and lifted onto the device 500 and conductors 510 and 512 until the device 500 and conductors are within the respective cavities 32 and 38 of the first cover body 22 and the second cover body 24 as shown in FIG. 4B. The jaws 522 of the extendable reach tool 520 are attached to the tool mounting member 78 of the locking member 50 and the tip portion 52 of the locking member is inserted into the locking aperture 28 in the first cover body 22 and then the locking aperture 34 in the second cover body 24, as shown in FIG. 12A. The locking member 50 is then rotated using the extendable reach tool 520 so that the gripping portion 54 of the locking member 50 sequentially engages the locking apertures 28 and 34 causing the cover 20 to glide along the gripping portion 54, as seen in FIG. 12B. Continued rotation of the locking member 50 causes the cover 20 to glide along the gripping portion 54 until the cover is within the holding portion 56 of the locking member 50. More specifically, the cover 20 glides along the gripping portion 54 until the portion of the first cover body 22 surrounding the locking aperture 28 and a portion of the second cover body 24 surrounding the locking aperture 34 are within the holding portion 56 of the locking member 50. When the cover 20 is within the holding portion 56 of the locking member 50, the first cover body 22 is locked to the second cover body 24 such that the electrical device 500 and portions of the conductors 510 and 512 are enclosed within the cover 20.

Turning now to FIGS. 15-22 additional exemplary embodiments of cover assemblies according to the present disclosure are shown. In the exemplary embodiment of FIGS. 15-18, the cover assembly 100 includes a cover 110 and locking member 200. The locking member 200 is used to lock the cover 100 onto an electrical device 500, seen in FIG. 4B, in proximity to a hinge of the cover. The cover 100 covers the electrical device 500 and a portion of one or more conductors 510 and 512 connected to the electrical device 500. The locking member 200 may be secured to the cover 100 by hand or using an extendable reach tool 520, such as a hot-stick seen in FIG. 1. In the exemplary embodiment of FIGS. 19-22, the cover assembly 150 includes a cover 160, first locking member 200 and a second locking member 50. The first locking member 200 is used to lock a portion of the cover 160 in proximity to a hinge 166 of the cover 160 onto an electrical device 500, seen in FIG. 4B, and the second locking member 50 is used to lock another portion of the cover 160 in proximity to a free end of the cover 160 onto the electrical device 500. The locking members 200 and 50 may be secured to the cover 160 by hand or using an extendable reach tool 520. It is noted that the locking member 200 in this exemplary embodiment is substantially similar to the locking member 50 described above, except that the length "L1" of the tip portion 52 in the locking member is less than the length "L1" of the tip portion 52 of the previously described locking member 50. Therefore, a detailed description of the locking member 50 is not repeated.

Referring to FIGS. 15-18, the cover assembly 100 includes a cover 110 and a locking member 200. The cover 110 includes a first cover body 112 and a second cover body 114. In the embodiment shown, the first cover body 112 has one end 112*a* joined to a hinge 116 and a free end 112*b*. At least a portion of the free end 112*b* of the first cover body 112 may be angled to form a lead-in that makes it easier for the cover 110 to pass over the electrical device 500 and conductors 510 and 512 when installed. Similarly, the second cover body 114 has one end 114*a* joined to the hinge 116 and a free end 114*b*. At least a portion of the free end 114*b* of the second cover body 114 may be angled to form a lead-in that also makes it easier for the cover 110 to pass over the electrical device 500 and conductors 510 and 512 when installed. The hinge 116 permits the first cover body 112 and the second cover body 114 to move between an open position seen in FIG. 17, and a closed position seen in FIG. 18. The hinge 116 may be for example a living hinge.

The first cover body 112 includes one or more locking apertures 118, a locking member 200 positioned near the end 112*a* in close proximity to the hinge 116. The one or more locking apertures 118 are used when locking the first cover body 112 to the second cover body 114. The first cover body 112 also includes a cavity 120, seen in FIG. 17, configured and dimensioned to receive the device 500 and the conductors 510 and 512 similar to that shown in FIGS. 4A and 4B. Similarly, the second cover body 114 includes one or more locking apertures 122 positioned near the end 114*a* in close proximity to the hinge 116. The one or more locking apertures 122 are used when locking the first cover body 112 to the second cover body 114. The second cover body 114 also includes a cavity 124 configured and dimensioned to receive the device 500 and the conductors 510 and 512. It is noted that the cavity 120 in the first cover body 112 and the cavity 124 in the second cover body 114 may form a larger combined cavity when the first cover body 112 is locked to the second cover body 114.

Referring to FIGS. 19-22, the cover assembly 150 includes a cover 160, a first locking member 200 and a second locking member 50. The cover 160 includes a first cover body 162 and a second cover body 164. In the embodiment shown, the first cover body 162 has one end 162*a* joined to a hinge 166 and a free end 162*b*. At least a portion of the free end 162*b* of the first cover body 162 may be angled to form a lead-in that makes it easier for the cover 160 to pass over the electrical device 500 and conductors 510 and 512 when installed. Similarly, the second cover body 164 has one end 164*a* joined to the hinge 166 and a free end 164*b*. At least a portion of the free end 164*b* of the second cover body 164 may be angled to form a lead-in that also makes it easier for the cover 160 to pass over the electrical device 500 and conductors 510 and 512 when installed. The hinge 166 permits the first cover body 162 and the second cover body 164 to move between an open position, seen in FIG. 21, and a closed position, seen in FIG. 22. The hinge 166 may be for example a living hinge.

The first cover body 162 includes one or more locking apertures 168. In this embodiment a first locking aperture 168 is positioned near the end 162*a* in close proximity to the hinge 166, and a second locking aperture 168 is positioned in close proximity to the free end 162*b*. The one or more locking apertures 168 are used when locking the first cover body 162 of the cover 160 to the second cover body 164. The first cover body 162 also includes a cavity 170 configured and dimensioned to receive the device 500 and the conductors 510 and 512 similar to that shown in FIGS. 4A and 4B. Similarly, the second cover body 164 includes one or more locking apertures 172 positioned near the end 164*a* in close proximity to the hinge 166, and a second locking aperture 172 is positioned in close proximity to the free end 164*b*. The one or more locking apertures 172 are used when locking the first cover body 162 of the cover 160 to the second cover body 164. The second cover body 164 also includes a cavity 174 configured and dimensioned to receive the device 500 and the conductors 510 and 512. It is noted that the cavity 170 in the first cover body 162 and the cavity 174 in the second cover body 164 may form a larger combined cavity when the first cover body 162 is locked to the second cover body 164.

Turning now to FIGS. 23-35 another exemplary embodiment of a locking member according to the present disclosure is shown. In this exemplary embodiment, the locking member 200 is configured and dimensioned to lock a first cover body, e.g., body 112 or 162 seen in FIGS. 15 and 19, of a cover 110 or 160 to a second cover body, e.g., body 114 or 164, of the cover when installed. This embodiment of the locking member 200 will be described with reference to the cover assembly 100 shown in FIGS. 15-18 and/or the cover assembly 150 shown in FIGS. 19-22. However, the locking member 200 as well as the locking member 50 can be used with all cover assemblies described herein and any other cover assemblies.

Figure 24:
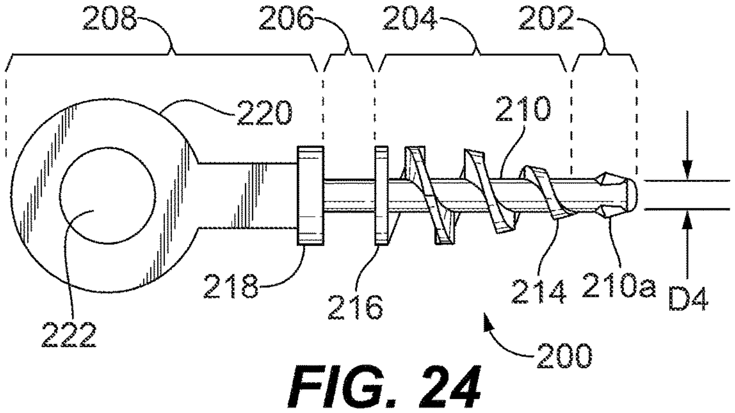
FIG. 24 is a plan view of the locking member of FIG. 23.
Figure 25:
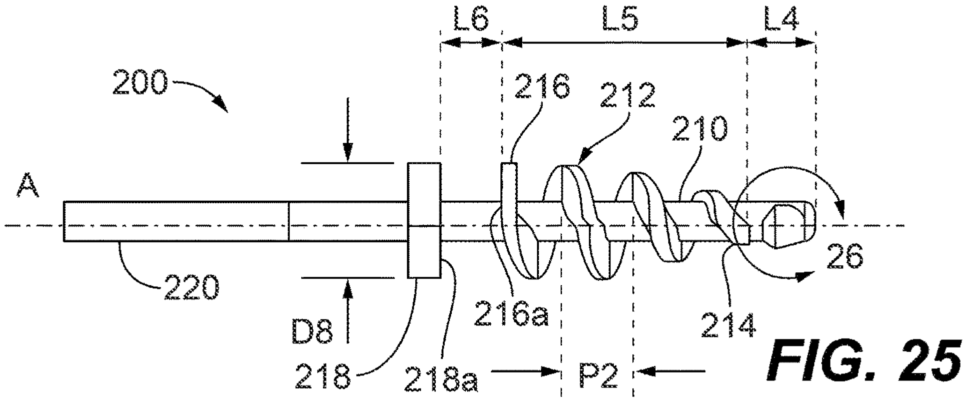
FIG. 25 is a side elevation view of the locking member of FIG. 23.
Figure 26:
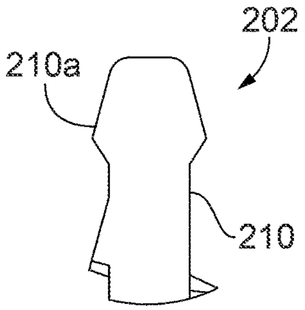
FIG. 26 is an enlarged view of a portion of the locking member of FIG. 24 taken from tip portion 202 of FIG. 24.
Figure 27:
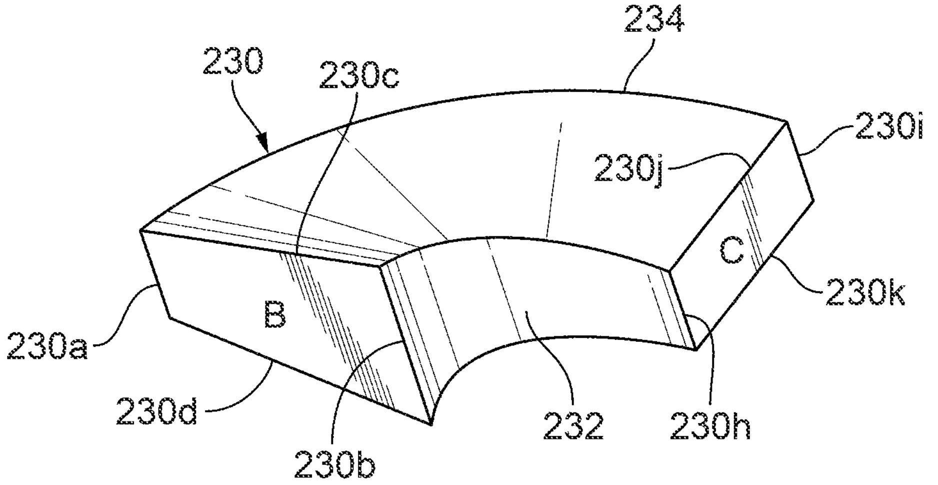
FIG. 27 is a perspective view of a segment of a spiral shaped flange forming a gripping portion of the locking member of FIG. 23, illustrating the segment with a narrow edge and a wide edge.

In the exemplary embodiment shown, the locking member 200 includes a tip portion 202, a gripping portion 204, a holding portion 206 and a head portion 208, seen in FIG. 24. Extending through the tip portion 202, the gripping portion 204 and the holding portion 206 is an axial portion or shaft 210. The shaft 210 has a longitudinal axis "A," seen in FIG. 25, and an outer diameter "D4," seen in FIG. 24, that is configured to fit within the locking apertures 118 and 122 in the cover 110, seen in FIG. 18, and the locking apertures 168 and 172 in the cover 160, seen in FIG. 22. The diameter "D4" may be in the range of, for example, about 0.3 inch and about 0.5 inch. In the exemplary embodiment shown in FIG. 24, the tip portion 202 includes a portion of the shaft 210 from a tip 210*a* of the shaft 210 and ending at the beginning of the gripping portion 204. The length "L4" of the shaft 210 forming the tip portion 202 is configured and dimensioned to extend through at least one of the locking apertures 118 or 122 in the cover 110, or at least one of the locking apertures 168 or 172 in the cover 160 before the gripping portion 204 engages the locking apertures. As a non-limiting example, the length "L4" of the shaft 210 forming the tip portion 202 may range from about 0.3 inch and about 1 inch. In this exemplary embodiment, the tip 210*a* has a portion that has a larger diameter than the diameter "D4" of the shaft 210. The larger diameter of the tip 210*a* permits the tip portion 210 to be inserted into the locking apertures 118 and/or 122 in the cover 110, or the locking apertures 168 and/or 172 in the cover 160 so that the tip portion 210 is held within the respective apertures 170 and/or 174 during installation.

Figure 23:
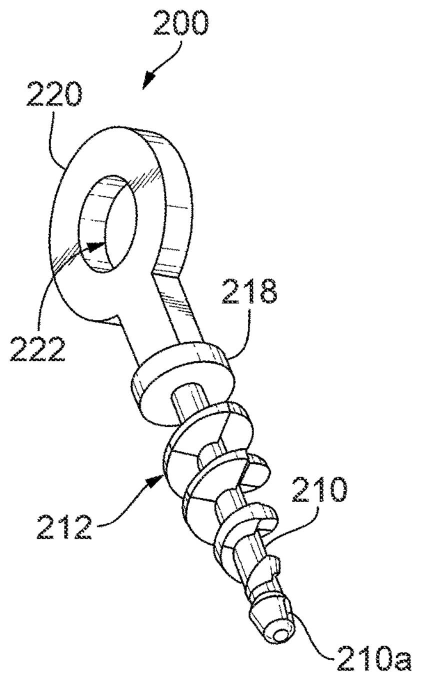
FIG. 23 is a perspective view of another exemplary embodiment of a locking member according to the present disclosure.
Figure 28:
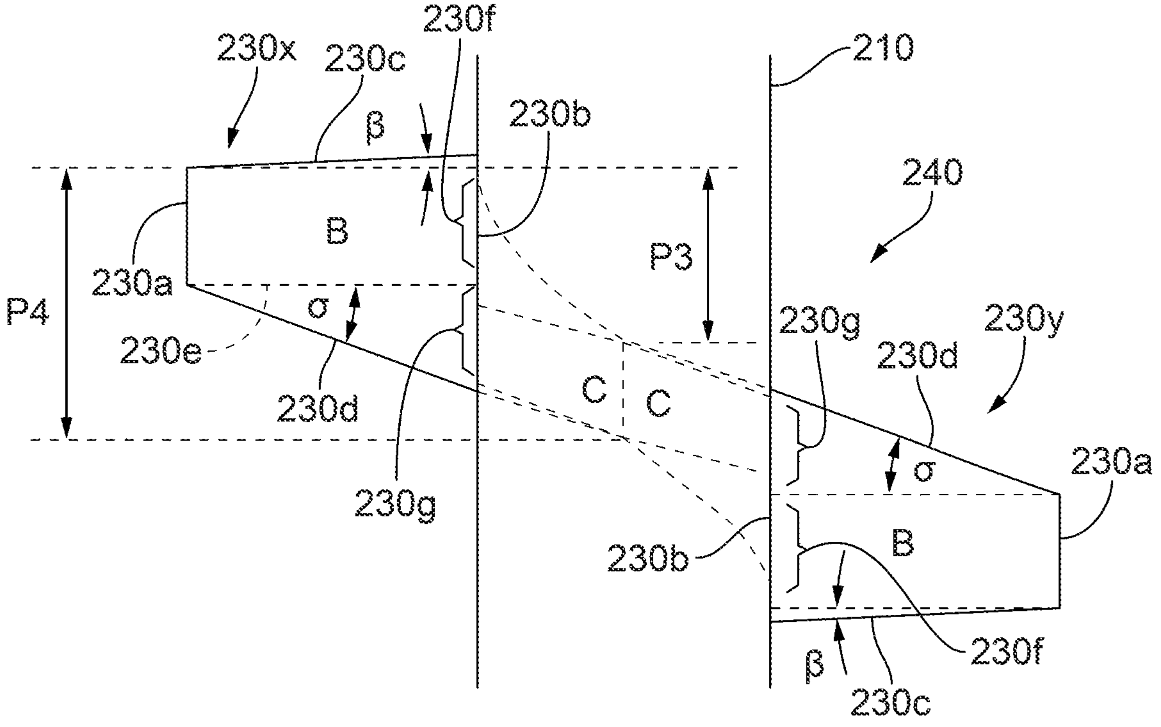
FIG. 28 is a side elevation view of two of the segments of FIG. 27 joined at their narrow edges to form a half helix section having the wide edges as a leading edge and a trailing edge.

Referring to FIGS. 23, 25 and 27-35, the gripping portion 204 of the locking member 200 includes a spiral shaped flange 212, e.g., a continuous helix like structure, wrapped around a portion of the shaft 210, as shown in FIG. 23. The length "L5" of the shaft 210 forming the gripping portion 204 extends from the first end 214 of the gripping portion to the second end 216. In this exemplary embodiment, the spiral shaped flange 212 is formed by joining a plurality of helix-like structures in series on the shaft 210 and then trimming the helix-like structures form the asymmetrical spiral shaped flange 212 on the shaft 210. More specifically, each helix-like structure is formed by joining two flange segments 230 together to form a half helix section 240 and then joining two half helix sections 240 to form a helix like structure. Each flange segment 230 is an asymmetric, arcuate shaped member having a first face "B" and a second face "C." The first face "B" is shaped as a trapezoid-like structure where two side walls 230*a* and 230*b* are in parallel. The side wall 230*b* is larger than the side wall 230*a* and is located at an inner wall 232 of the flange segment 230, and the side wall 230*a* is located at an outer wall 234 of the flange segment 230. The top wall 230*c* extends from the larger side wall 230*b* to the smaller side wall 230*a* at an angle "β" relative to the side walls 230*a* and 230*b*. The angle "β" may be in the range of for example 89 degrees and 95 degrees. The bottom wall 230*c* extends from the larger side wall 230*b* to the smaller side wall 230*a* at a predefined angle "σ." The predefined angle "σ" is relative to imaginary line 230*e*, which is at a substantially right angle relative to the side wall 230*a* and side wall segment 230*f*, as seen in FIG. 28. The predefined angle may be in the range of about 15 degrees to about 40 degrees. Another way to view the face "B" is a rectangle defined by side wall 230*a*, side wall segment 230*f*, top wall 230*c* and imaginary line 230*e* plus a triangle defined by the bottom wall 230*d*, imaginary line 230*e* and side wall segment 230*g*. The second face "C" is shaped as a rectangle with side walls 230*h* and 230*i*, a top wall 230*j* and a bottom wall 230*k*. The top wall 230*j* and bottom wall 230*k* of face "C" are not located in the same plane as the top wall 230*c* of the face "B" so that there is a distance "P3" between the top wall 230*c* of the face "B" and the top wall 230*j* of the face "C", and so that there is a distance "P4" between the top wall 230*c* of the face "B" and the bottom wall 230*k* of the face "C" as shown in FIG. 28. It is noted that the face "B" may also be referred to herein as a "wide edge" of the flange segment 230 and the face "C" may also be referred to herein as a "narrow edge" of the flange segment 230.

Figure 29:
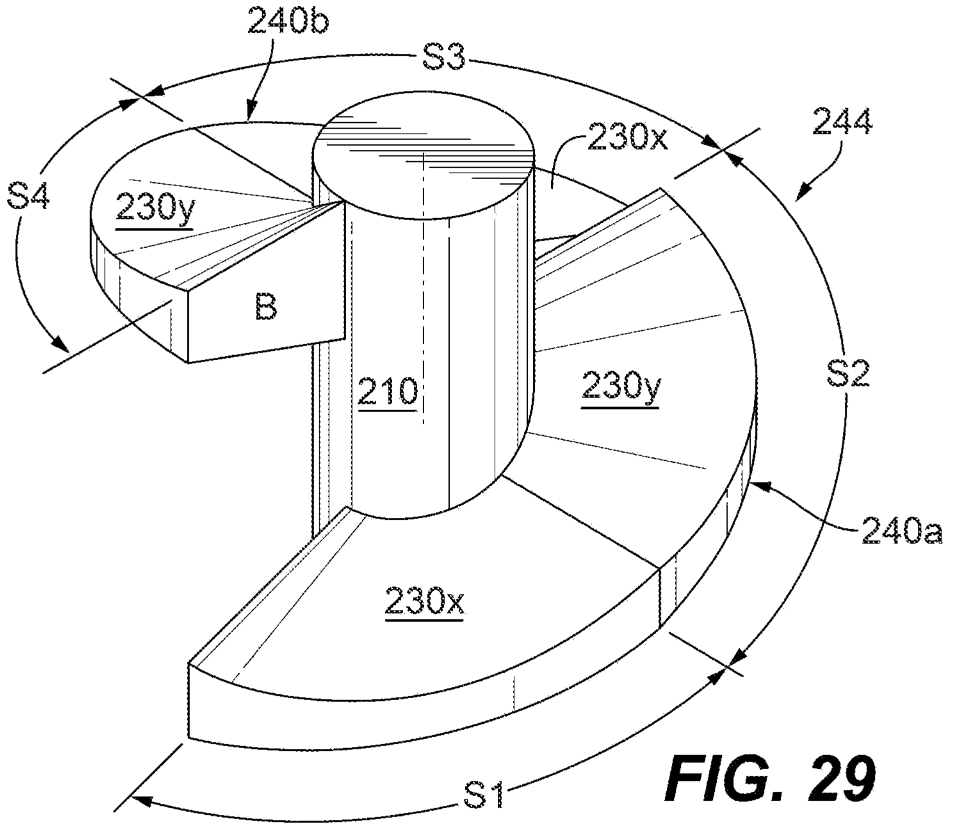
FIG. 29 is a top perspective view of two half helix sections of FIG. 28 joined at their wide edges and around a shaft of the locking member of FIG. 23 and forming a single helix-like structure.

To form the half helix section 240, the face "C" of a first flange segment 230*x*, seen in FIG. 28, is joined to the face "C" of a second flange segment 230*y* which forms a continuous junction between the two flange segments 230*x* and 230*y* so that the inner wall 232 of the two flange segments 230 form a substantially 180 degree arc having a similar shape as the outer wall of the shaft 210, as shown in FIG. 29. In this configuration, the face "B" of the first flange segment 230*x* (represented as S1) is the leading edge of the half helix section 240*a* and the face "B" of the second flange segment 230*y* (represented as S2) is the trailing edge of the half helix section 240*a*.

Figure 30:
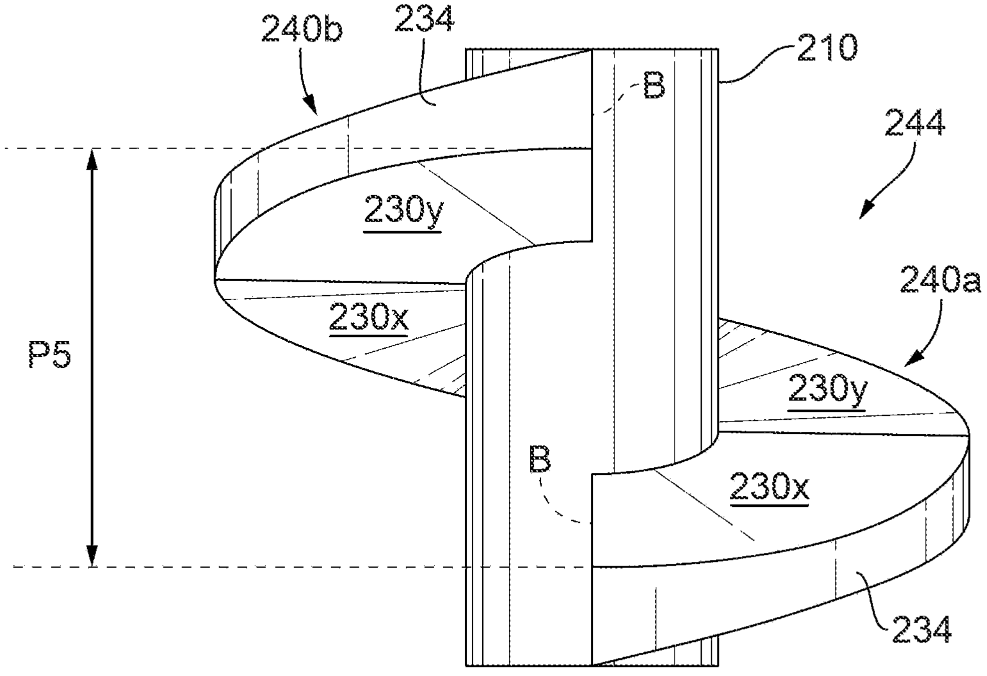
FIG. 30 is a side elevation view of the single helix-like structure of FIG. 29, illustrating a pitch from a leading edge of a first half helix section to a trailing edge of a second half helix section.
Figure 31:
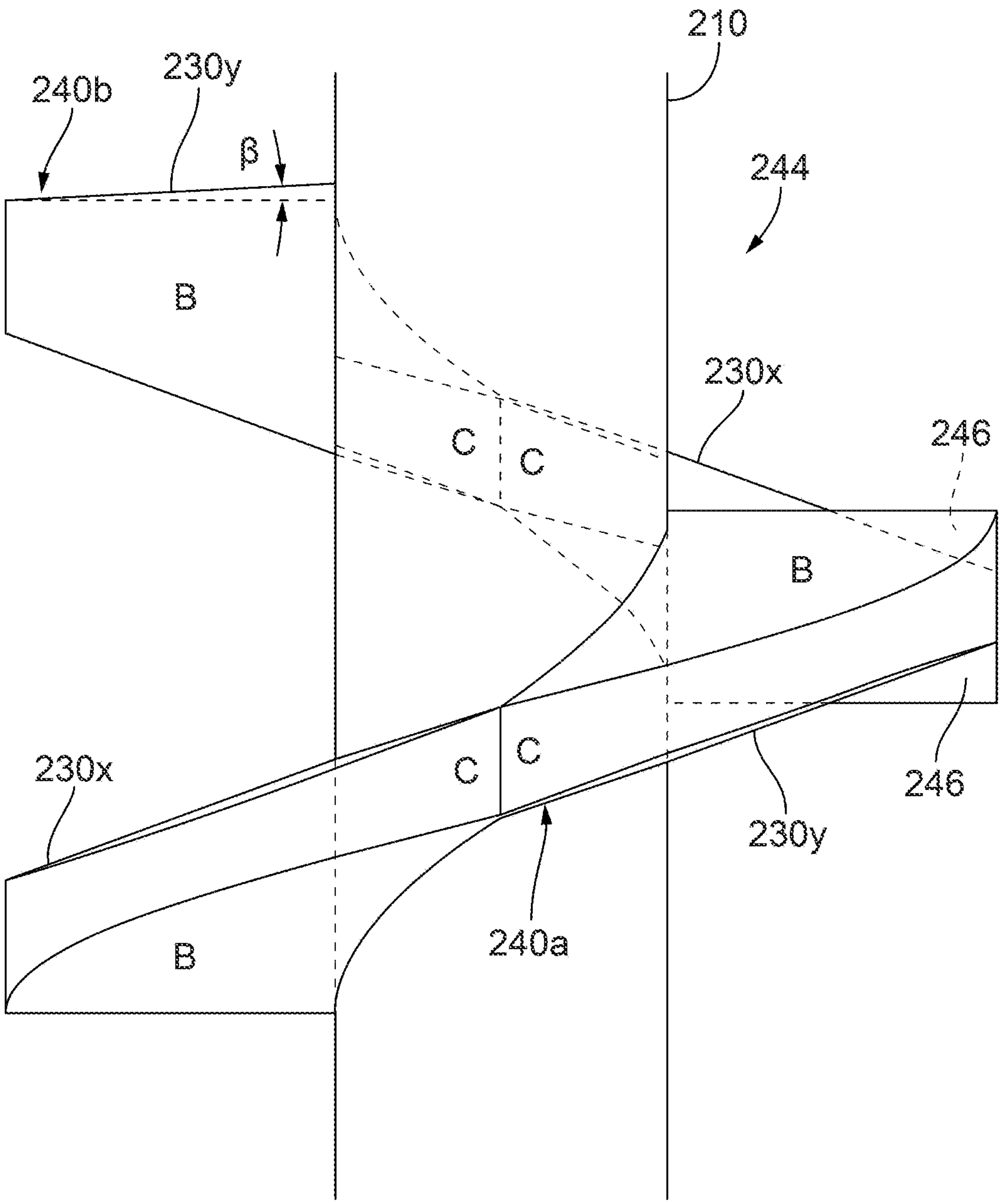
FIG. 31 is a side elevation view of the single helix-like structure of FIG. 29, illustrating an offset orientation at the junction between the trailing edge of the first half helix section and a leading edge of the second half helix section.

To form the single helix-like structure 244, the trailing edge of the second flange segment 230*y* of the first half helix section 240*a* is joined to the leading edge of the first flange section 230*x* of the second half helix section 240*b* (represented as S3). As shown in FIG. 30, the single helix-like structure 244 has a distance "P5" (or pitch) from the leading edge of the first flange section 230*x* of the first half helix section 240*a* to the trailing edge of the second flange section 230*y* of the second half helix section 240*b* (represented as S4). As shown in FIG. 31, at the junction between the first half helix section 240*a* and the second half helix section 240*b* of the single helix-like structure 244, the joined faces "B" result in offset areas 246 that permit manufacturing by injection molding processes which result in the offset areas 246.

Figure 32:
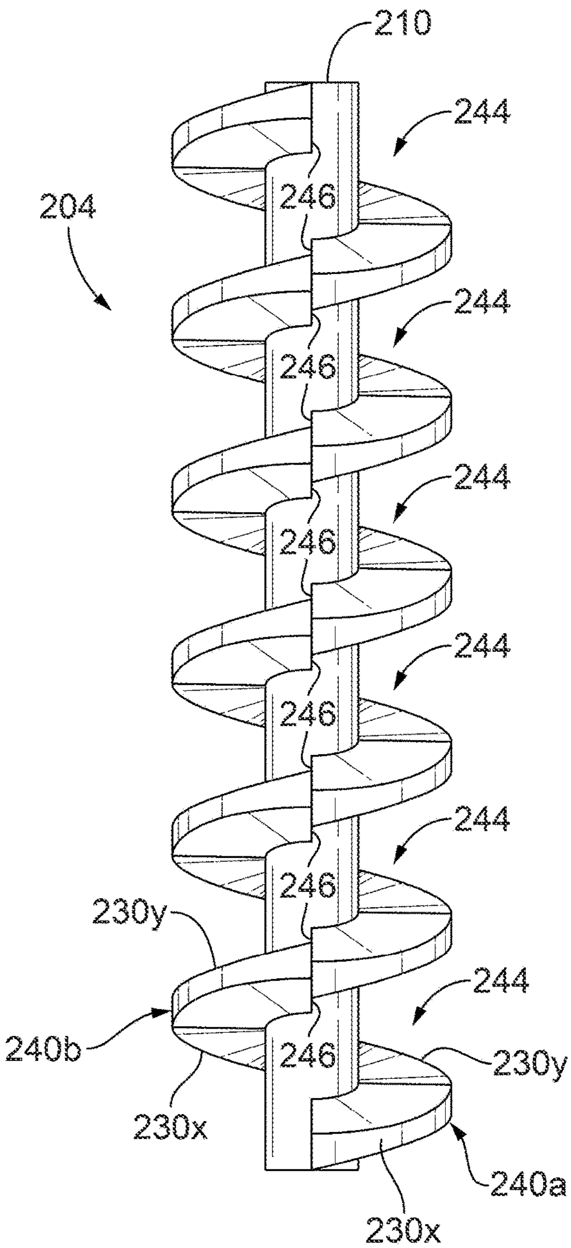
FIG. 32 is a first side elevation view of multiple single helix-like structures of FIG. 29 joined to form a continuous helix like structure, illustrating the offset orientation at the junction between the trailing edge of the first half helix section and a leading edge of the second half helix section of each of the multiple single helix-like structures.
Figure 33:
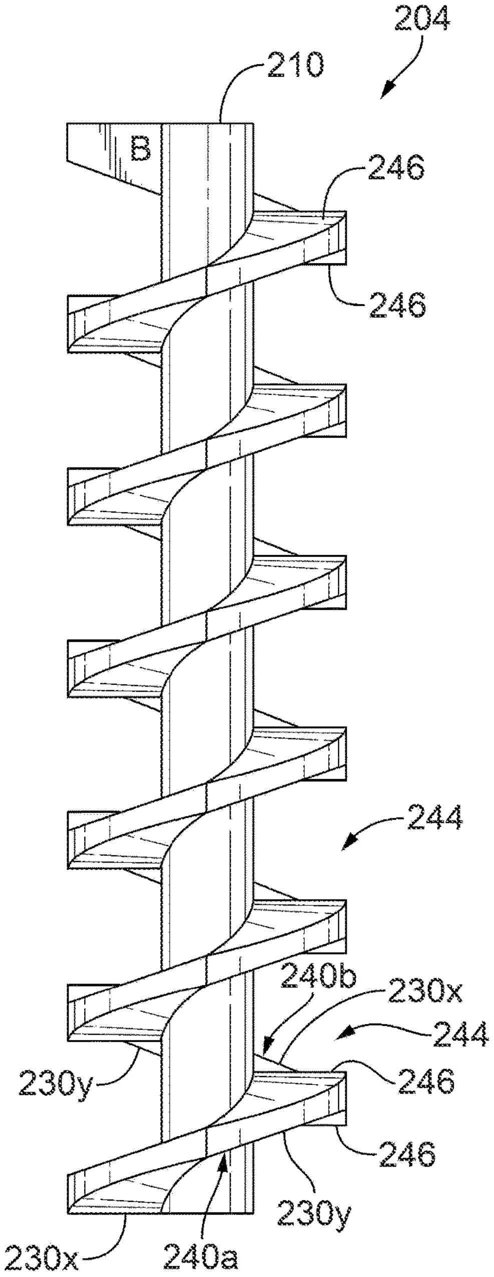
FIG. 33 is a second side elevation view of the continuous helix like structure of FIG. 32, illustrating the junction of the segments of FIG. 27 joined at their narrow edges.
Figure 34:
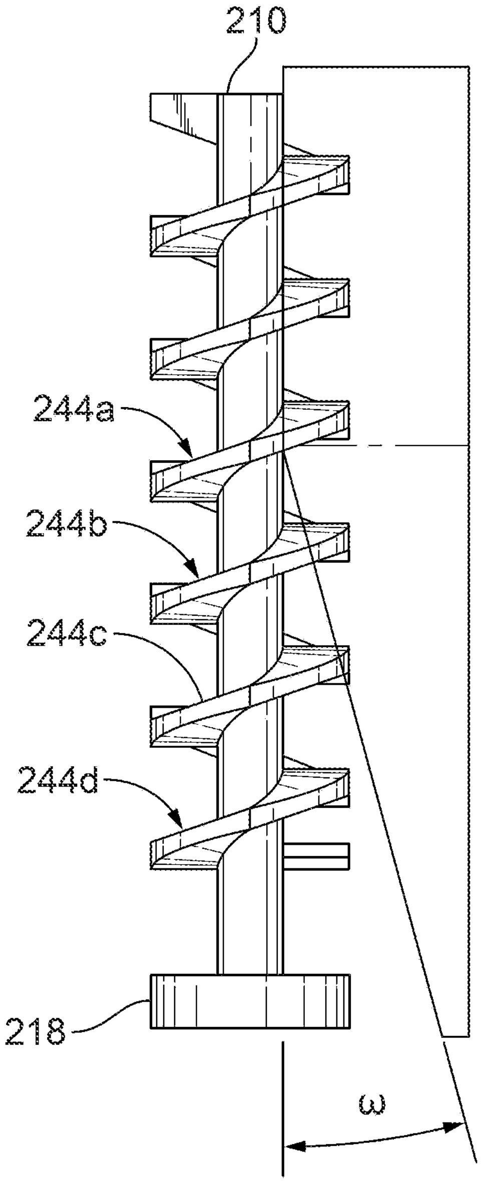
FIG. 34 is a side elevation view of the continuous helix like structure of FIG. 32, illustrating multiple single helix-like structures being trimmed to form an asymmetrical spiral shaped flange on the shaft.
Figure 35:
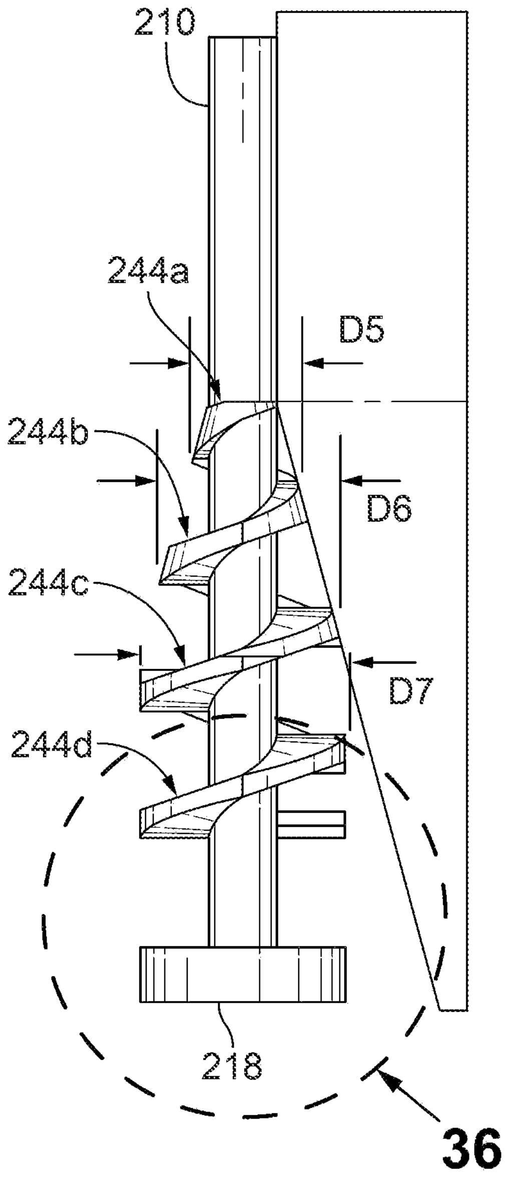
FIG. 35 is a side elevation view of the continuous helix like structure of FIG. 34, illustrating the multiple single helix-like structures after trimming to reveal the asymmetrical spiral shaped flange on the shaft.

A plurality of single helix-like structures 244 are then arranged on the shaft 210 in series as shown in FIGS. 32 and 33. To form the spiral shaped flange 212 of the locking member 200, seen in FIG. 23, the series of single helix-like structures 244 are then trimmed to form a spiral shaped flange 212 having a series of single helix-like structures 244 that have different diameters. For example, in FIG. 35, the first single helix-like structure 244*a* has diameter "D5" that may be trimmed to about 30 percent and about 70 percent of the original diameter of the first single helix-like structure 244*a*, seen in FIG. 34, depending upon the original diameter of the single helix-like structure 244*a* and the angle "o" of the taper. The second single helix-like structure 244*b* has diameter "D6" that may be trimmed to about 5 percent and about 15 percent of the original diameter of the second single helix-like structure 244*b*, seen in FIG. 34, depending upon the original diameter of the single helix-like structure 244*b* and the angle "to" of the taper. The third single helix-like structure 244*c* has diameter "D7" that may be trimmed to about 90 percent and about 100 percent of the original diameter of the third single helix-like structure 244*c*, seen in FIG. 34, depending upon the original diameter of the single helix-like structure 244*c* and the angle "to" of the taper. As a more specific example, the diameter "D5" may be about 0.39 inches, the diameter "D6" may be about 0.70 inches and the diameter "D7" may be about 0.75 inches. As a result, the spiral shaped flange 212 has a series of single helix-like structures 244 that form a taper with the narrowest portion of the taper closest to the tip portion 202 of the locking member 200, and the widest portion of the taper closest to the holding portion 206, seen in FIG. 24 of the locking member 200 as shown in FIGS. 34 and 35. The angle "Co" of the taper may be in the range of about 10 degrees and about 30 degrees.

As noted above, the first end 214 of the gripping portion 204 is configured to engage the cover, e.g., cover 110 or 160, and to guide the movement of the cover 110 or 160 along the longitudinal axis "A" of the shaft 210 in a first longitudinal direction, identified as arrow "X" in FIGS. 12A and 12B. Movement of the cover, e.g., cover 110 or 160, in the first longitudinal direction begins at the first end 214 of the gripping portion 204, past the second end 216 until the cover enters the holding portion 206.

Referring again to FIGS. 23-26, the holding portion 206 of the locking member 200 includes a portion of the shaft 210 from the second end 216 of the gripping portion 204 to a head member 218 of the head portion 208 of the locking member 200. The length "L6" of the shaft 210 forming the holding portion 206 is configured and dimensioned to receive a portion of the first cover body 112 or 162 surrounding the respective locking aperture 118 or 168 and a portion of the second cover body 114 or 164 surrounding the respective locking aperture 122 or 172. For example, in the embodiment of the cover assembly 100 shown in FIGS. 15-18, the length "L6" of the holding portion 206 is dimensioned so that it is approximately the same length as the thickness "T3" of the combination of the first cover body 112 and the second cover body 114 in the area of the locking apertures 112 and 118, seen in FIG. 18. Similarly, in the embodiment of the cover assembly 150 shown in FIGS. 19-22, the length "L6" of the holding portion 206 is dimensioned so that it is approximately the same length as the thickness "T3" of the combination of the first cover body 162 and the second cover body 164 in the area of the locking apertures 168 and 172, seen in FIG. 22.

By having the length "L6" approximately the same length as the thickness "T3" the cover 110 or 160 is held tight within the holding portion 206 of the locking member 200 when the cover 110 or 160 is installed. However, it is also possible for the length "L6" of the holding portion 206 to be a slightly smaller than the thickness "T3" (e.g., up to about fifteen percent) such that when the cover, e.g., cover 110 or 160, is within the holding portion 206 pressure is applied by the second end 216 of the gripping portion 204 and the head member 218 of the head portion 208 to the cover 110 or 160 causing the cover to slightly deform within the holding portion 206. As a non-limiting example, the length "L6" of the shaft 210 forming the holding portion 206 may range from about 0.1 inch and about 0.5 inch. The second end 216 of the gripping portion 204 has an outside surface 216*a* that forms one end of the holding portion 206 and is configured to contact the cover, e.g., cover 110 or 160, when the cover is in the holding portion 206. The outside surface 216*a* is used to stop or prevent the cover 110 or 160 from moving in a second longitudinal direction, which is identified as arrow "Y" in FIG. 12C, along the shaft 210. In the exemplary embodiment shown, the second longitudinal direction is opposite to the first longitudinal direction.

Continuing to refer to FIGS. 23-26, the head portion 208 of the locking member 200 includes the head member 218 that is at the end of the shaft 210. The head member 218 may be integrally or monolithically formed to the end of the shaft 210 or the head member 218 may be attached to the shaft 210 using for example, welded joints or adhesives. The head member 218 has an outer diameter "D8" that is greater than or equal to the diameter "D7" of the last in line helix-like structure 244*d* seen in FIG. 35. The outer diameter "D8" of the head member 218 may be, for example, in the range of about 0.75 and about 2 inches. The head member 218 has an outside surface 218*a* that forms a second end of the holding portion 206 and is configured to contact the cover, e.g., cover 110 or 160, when the cover is within the holding portion 206. The outside surface 218*a* of the head member 218 is used to stop or prevent the cover 110 or 160 from moving in the first longitudinal direction along the shaft 210.

The head member 218 of the head portion 208 has a tool mounting member 220 extending in a direction away from the holding portion 206, as seen in FIG. 24. The tool mounting member 220 may be integrally or monolithically formed into the head member 218 or secured to the head member 218 using welded joints or adhesives. In the exemplary embodiment shown, the tool mounting member 220 is a ring-like member, e.g., an eyelet, having a central opening 222 through which jaws or fingers 522 of the extendible reach tool 520, seen in FIG. 1, may engage the tool mounting member 220. The extendible reach tool 520 can then be used to rotate the locking member 200 when installing the cover assembly 100 or 150. The opening 222 in the tool mounting member 220 may have a circular shape, an oval shape, a quadrilateral shape or any other shape that permits the extendible reach tool 520 to engage the tool mounting member 220.

Figure 17:
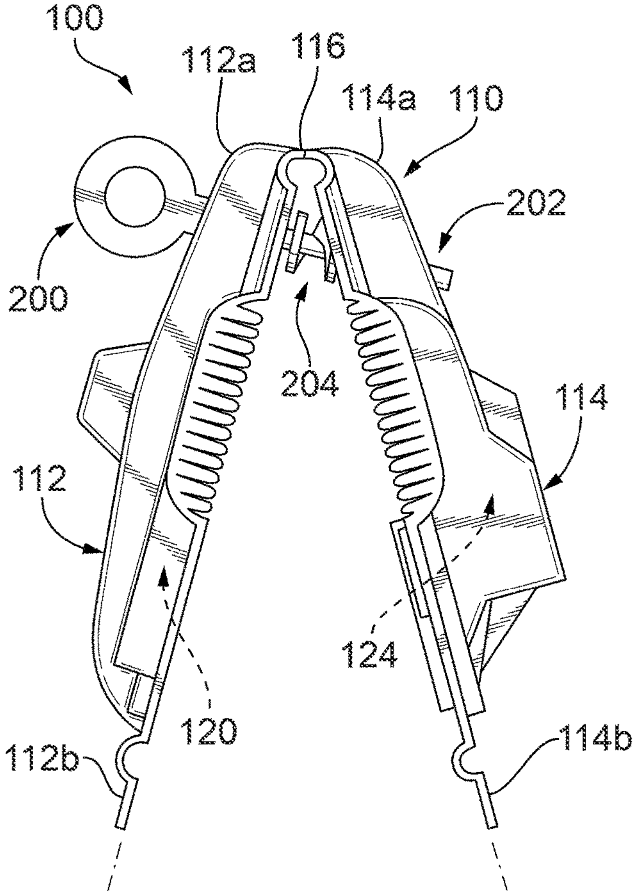
FIG. 17 is an end elevation view of the insulating cover assembly of FIG. 15 with the insulating cover in the open position.
Figure 18:
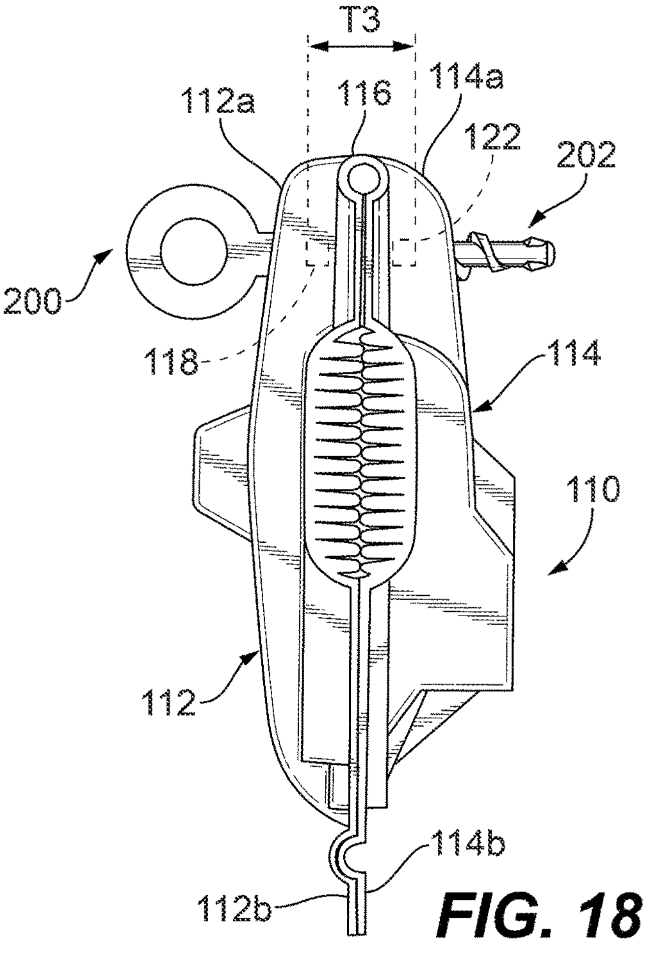
FIG. 18 is an end elevation view of the insulating cover assembly of FIG. 15 with the insulating cover in the closed position and the locking member locking the insulating cover in the closed position.
Figure 19:
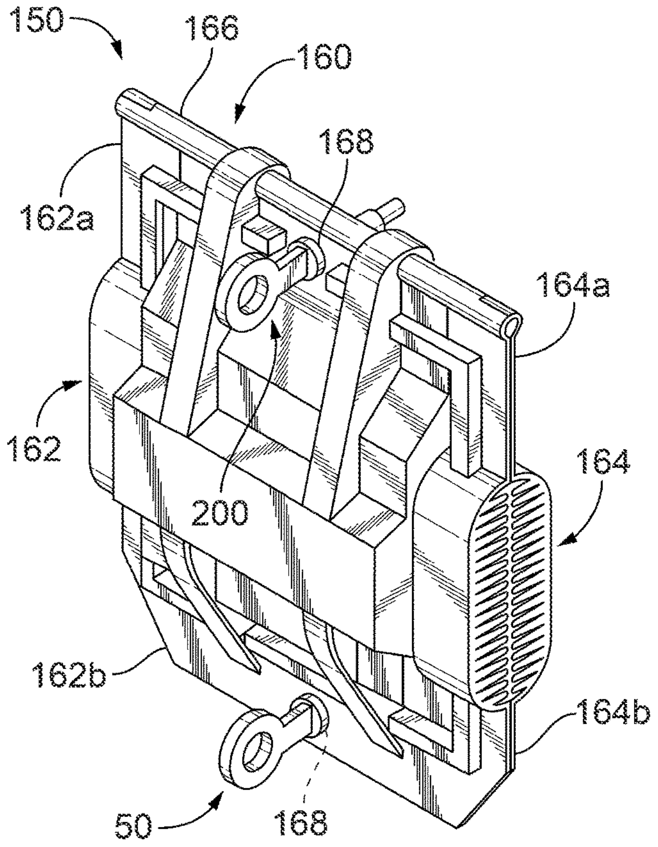
FIG. 19 is a side perspective view of another exemplary embodiment of an insulating cover assembly according to the present disclosure, illustrating another exemplary embodiment of an insulating cover and multiple locking members with the insulating cover in a closed position.
Figure 20:
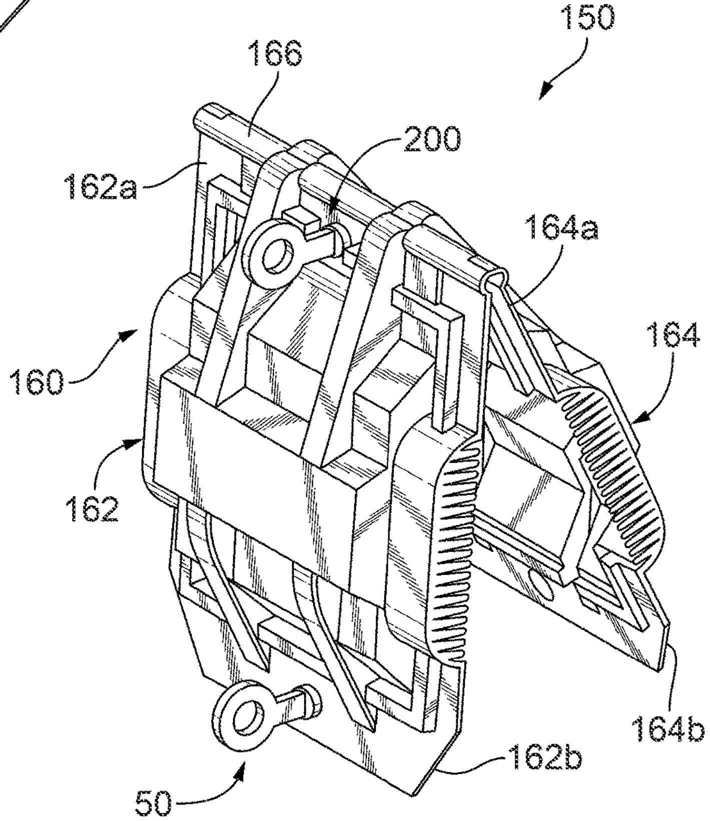
FIG. 20 is a side perspective view of the insulating cover assembly of FIG. 19, illustrating the insulating cover in an open position.

The installation of the cover assembly 100 of FIGS. 15-18 will be described using one or more extendible reach tools 520. To install the cover assembly 100, the first cover body 112 and the second cover body 114 of the cover 110 are initially set in the open position, seen in FIGS. 15 and 17. It is noted that when in the open position, the locking aperture 118 of the first cover body 112 is held within the holding portion 206 of the locking member 200, and the tip portion 202 of the locking member 200 is held within the locking aperture 122 in the second cover body 114 by the tip 110*a* of the tip portion 202, as shown in FIG. 17. The jaws 522 of the extendable reach tool 520 are attached to the tool mounting member 220 of the locking member 200, and the cover assembly 100 is lifted onto the device 500 and conductors 510 and 512 until the device 500 and conductors 510 and 512 are within the respective cavities 120 and 124 of the first cover body 112 and the second cover body 114. The jaws 522 of the extendable reach tool 520, seen in FIG. 1, are then rotated causing the tool mounting member 220 to rotate the locking member 200 so that the gripping portion 204 of the locking member 200 sequentially engages the locking aperture 122 causing the second cover body 114 to glide along the gripping portion 204. Continued rotation of the locking member 200 causes the second cover body 114 to glide along the gripping portion 204 until the cover 110 is within the holding portion 206 of the locking member 200. More specifically, the second cover body 114 glides along the gripping portion 204 until a portion of the second cover body 114 surrounding the locking aperture 122 is within the holding portion 206 of the locking member 200. When the cover 110 is within the holding portion 206 of the locking member 200, the first cover body 112 is locked to the second cover body 114 such that the electrical device 500 and portions of the conductors 510 and 512 are enclosed within the cover 110.

Figure 21:
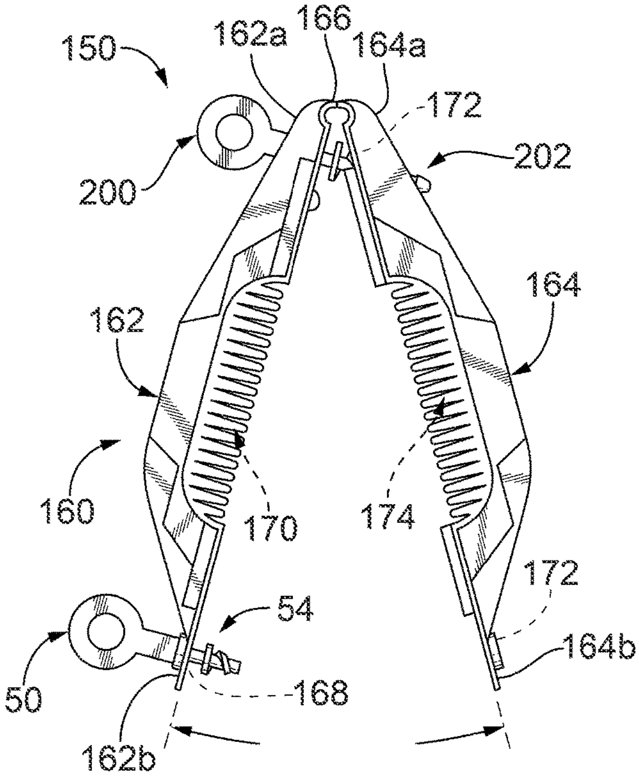
FIG. 21 is an end elevation view of the insulating cover assembly of FIG. 20 with the insulating cover in the open position.
Figure 22:
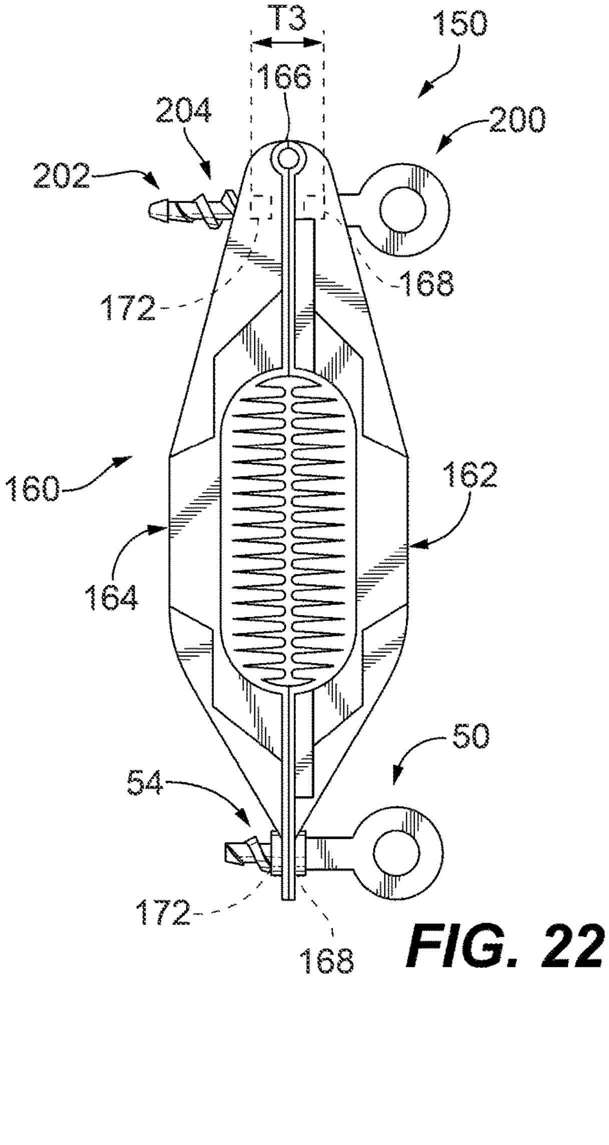
FIG. 22 is an end elevation view of the insulating cover assembly of FIG. 19 with the insulating cover in the closed position and the locking members locking the insulating cover in the closed position.

The installation of the cover assembly 150 of FIGS. 19-22 will be described using one or more extendible reach tools 520. To install the cover assembly 150, the first cover body 162 and the second cover body 164 of the cover 160 are initially set in the open position, seen in FIGS. 20 and 21. It is noted that when in the open position, the locking aperture 168 of the first cover body 162 is held within the holding portion 206 of the locking member 200, and the tip portion 202 of the locking member 200 is held within the locking aperture 172 in the second cover body 164 by the tip 110*a* of the tip portion 202, as shown in FIG. 21. It is also noted that when in the open position, the holding portion 56, seen in FIG. 21, of the second locking member 50 is held within the locking aperture 168 in the free end 162*b* of the first cover body 162, as shown in FIG. 21. The jaws 522 of the extendable reach tool 520 are attached to the tool mounting member 220 of the locking member 200, and the cover assembly 150 is lifted onto the device 500 and conductors 510 and 512 until the device 500 and conductors 510 and 512 are within the respective cavities 170 and 174 of the first cover body 162 and the second cover body 164. The jaws 522 of the extendable reach tool 520, seen in FIG. 1, are then rotated causing the tool mounting member 220 to rotate the locking member 200 so that the gripping portion 204 of the locking member 200 sequentially engages the locking aperture 172 causing the second cover body 164 to glide along the gripping portion 204. Continued rotation of the locking member 200 causes the second cover body 164 to glide along the gripping portion 204 until the cover assembly 150 is within the holding portion 206 of the locking member 200. More specifically, the second cover body 164 glides along the gripping portion 204 until the portion of the second cover body 164 surrounding the locking aperture 172 is within the holding portion 206 of the locking member 200, as seen in FIG. 22. The jaws 522 of the extendable reach tool 520 are then attached to the tool mounting member 78 of the second locking member 50. The jaws 522 of the extendable reach tool 520 are then rotated causing the tool mounting member 78 to rotate the second locking member 50 so that the gripping portion 54 of the second locking member 50 sequentially engages the locking aperture 172 at the free end 164*b* of the second cover body 164 causing the free end 164*b* of the second cover body 164 to glide along the gripping portion 54. Continued rotation of the second locking member 50 causes the free end 164*b* of the second cover body 164 to glide along the gripping portion 54 until the second cover body 164 is within the holding portion 56 of the locking member 50, as seen in FIG. 22. When the cover 160 is within the holding portion 206 of the first locking member 200 and the holding portion 56 of the second locking member 50, the first cover body 162 is locked to the second cover body 164 such that the electrical device 500 and portions of the conductors 510 and 512 are enclosed within the cover 160.

Figure 36:
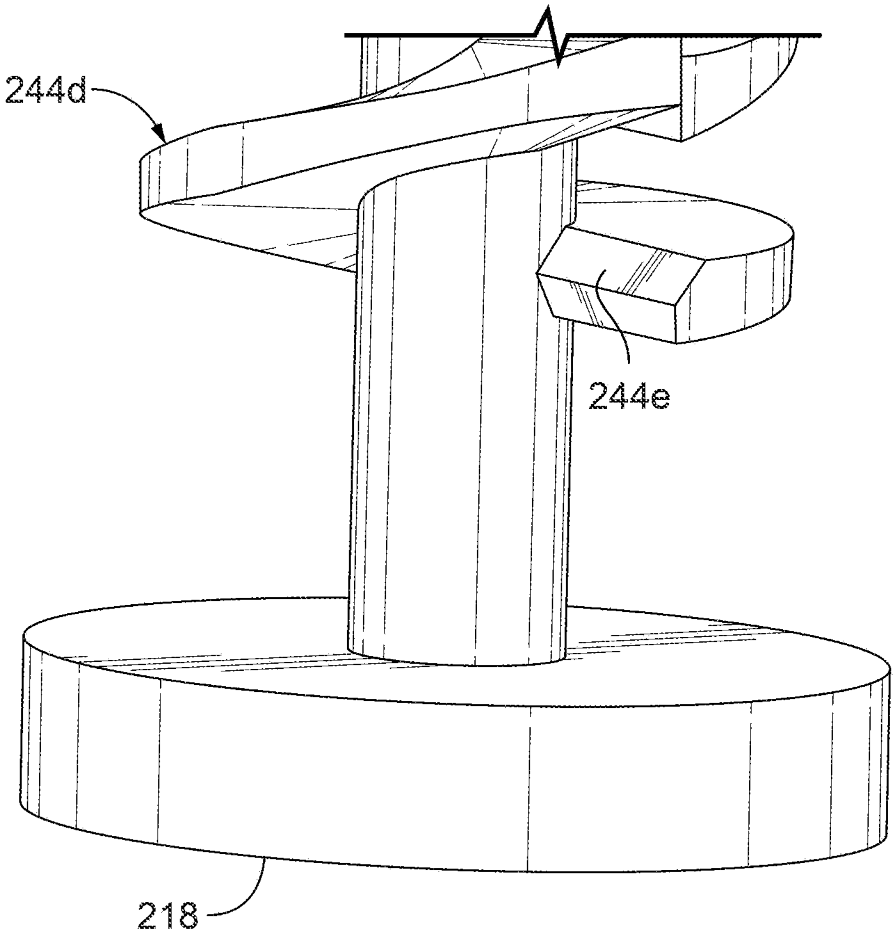
FIG. 36 is an enlarged perspective view of a portion of the continuous helix like structure of FIG. 35, illustrating a chamfered or pointed tip at an end of the helix like structure.

To remove the cover assembly 150 from the device 500 and conductors 510 and 512, the jaws 522 of the extendable reach tool 520 are attached to the tool mounting member 78 of the second locking member 50. The jaws 522 of the extendable reach tool 520 are then rotated in a counterclockwise direction causing the tool mounting member 78 and thus the second locking member 50 to rotate in a counterclockwise direction so that the end of the gripping portion 54 adjacent the holding portion 56 of the second locking member 50 disengages from the locking aperture 172 at the free end 164*b* of the second cover body 164. Continued rotation of the second locking member 50 causes the free end 164*b* of the second cover body 164 to glide along the gripping portion 54 in a reverse direction until the second cover body 164 is freed from the second locking member 50 permitting the cover to be moved to the open position. It is noted that the in some instances it may be difficult for the end of the gripping portion 54 to disengage from the locking aperture 172. To facilitate easier removal of the end of the gripping portion 54 from the locking aperture 172, the end of the gripping portion 54 may include a chamfer or pointed tip 244*e*, seen in FIG. 36, creating an edge for the end of the gripping portion 54 to cut through the locking aperture 172. Similarly, the jaws 522 of the extendable reach tool 520 are attached to the tool mounting member 220 of the locking member 200. The jaws 522 of the extendable reach tool 520 are then rotated in a counterclockwise direction causing the tool mounting member 220 and thus the locking member 200 to rotate in a counterclockwise direction so that the end of the gripping portion 204 adjacent the holding portion 206 of the locking member 200 disengages from the locking aperture 172 at the end 164*a* of the second cover body 164. Continued rotation of the locking member 200 causes the end 164*a* of the second cover body 164 to glide along the gripping portion 204 in a reverse direction until the second cover body 164 is freed from the locking member 200 permitting the cover to be moved to the open position. It is noted that the in some instances it may be difficult for the end of the gripping portion 204 to disengage from the locking aperture 172. To facilitate easier removal of the end of the gripping portion 204 from the locking aperture 172, the end of the gripping portion 204 may include a chamfer or pointed tip 244*e*, seen in FIG. 36, creating an edge for the end of the gripping portion 204 to cut through the locking aperture 172.

It is noted that the insulating covers contemplated by the present disclosure are made of an electrically insulating material, and preferably an electrically insulating material having a dielectric rating of at least 69 KV. The dielectric rating is dependent upon a number of factors, including the thickness of the electrically insulating material. It is also desirable that the electrically insulating material is sufficient to meet or exceed the UL-94V0 flame mitigation material standard. Non-limiting example of electrically insulating materials include, but are not limited to, polymeric materials, plastisol or nylon. The insulating covers contemplated by the present disclosure can be made by an injection molded process, or dip molded or vacuum formed processes. It is also noted that the locking members contemplated by the present disclosure are made of an electrically insulating material, and preferably an electrically insulating material having a dielectric rating of at least 69 KV. The dielectric rating is dependent upon a number of factors, including the thickness of the electrically insulating material. It is also desirable that the electrically insulating material is sufficient to meet or exceed the UL-94V0 flame mitigation material standard. Non-limiting example of electrically insulating materials include, but are not limited to, nylon, fiberglass, plastisol, PVC. The locking members 50 and 200 contemplated by the present disclosure can be made by an injection molded process, or vacuum formed, machined on lathe processes. In addition, the locking members contemplated by the present disclosure can be integrally or monolithically formed or made by joining separate components.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art, and are intended to fall within the scope of the invention.

What is claimed is:

1. A cover assembly for a high-voltage electrical connector, the cover assembly comprising:
- an insulating cover having a first cover portion and a second cover portion, the first cover portion having a first aperture and the second cover portion having a second aperture, wherein the second aperture aligns with the first aperture when the cover is in the closed position; and
- a locking member interactive with first aperture and the second aperture to releasably lock the first cover portion to the second cover portion, the locking member including:
  - a spiral flange that extends around at least a portion of a shaft, wherein a beginning of the spiral flange is at a first end of the shaft or proximate the first end of the shaft;
  - a head member positioned at a second end of the shaft, wherein the spiral flange ends proximate the head member or at the head member; and
  - a tool mounting member extending from the head member, the tool member having an opening.

2. The cover assembly according to claim 1, wherein an outer diameter of the spiral flange gradually increases along the shaft, with a smallest outer diameter is at the beginning of the spiral flange and a largest diameter is at an end of the spiral flange proximate the head member or at the head member.

3. The cover assembly according to claim 1, wherein the shaft includes a holding portion, wherein the spiral flange ends at a first end of the holding portion, and wherein a second end of the holding portion is proximate the head member or at the head member.

4. The cover assembly according to claim 3, wherein the first end and the second end of the holding portion are configured to contact the cover at least when the cover is in the closed position.

5. The cover assembly according to claim 1, wherein the tool mounting member comprises a ring-like member having the opening.

6. The cover assembly according to claim 5, wherein the ring-like member comprises an eyelet.

7. The cover assembly according to claim 1, wherein the first cover portion is joined to the second cover portion by at least one hinge.

8. The cover assembly according to claim 7, wherein the at least one hinge comprises a living hinge.

9. The cover assembly according to claim 7, wherein the first aperture and the second aperture are proximate the at least one hinge.

10. A cover assembly for a high-voltage electrical connector, the cover assembly comprising:

- a first cover portion and a second cover portion, the cover portions being movable between an open position and a closed position; and
- a locking member configured to releasably lock the first cover portion to the second cover portion when the cover portions are in the closed position, the locking member including:
  - a shaft having a first end and a second end;
  - a spiral flange that extends around at least a portion of the shaft, wherein a beginning of the spiral flange is proximate the first end of the shaft or at the first end of the shaft;
  - a head portion having a head member that is positioned at the second end of the shaft, wherein the spiral flange ends proximate the head member or at the head member; and
  - a tool mounting member extending from the head member, the tool member having an opening.

11. The cover assembly according to claim 10, wherein an outer diameter of the spiral flange gradually increases along the shaft.

12. The cover assembly according to claim 10, wherein the shaft includes a holding portion, wherein the spiral flange ends at a first end of the holding portion, and wherein a second end of the holding portion is proximate the head member or at the head member.

13. The cover assembly according to claim 12, wherein the first end and the second end of the holding portion are configured to contact the cover portions at least when the cover portions are in the closed position.

14. The cover assembly according to claim 10, wherein the tool mounting member comprises a ring-like member having the opening.

15. The cover assembly according to claim 14, wherein the ring-like member comprises an eyelet.

16. The cover assembly according to claim 10, wherein the first cover portion is joined to the second cover portion by at least one hinge.

17. The cover assembly according to claim 16, wherein the at least one hinge comprises a living hinge.

18. The cover assembly according to claim 16, wherein first cover portion includes a first aperture proximate the at least one hinge and a second cover portion includes a second aperture proximate the at least one hinge, and wherein the locking member is interactive with the first aperture and the second aperture when releasably locking the first cover portion to the second cover portion.

19. A cover assembly for a high-voltage electrical connector, the cover assembly comprising:

- an insulating cover having a first cover portion joined to a second cover portion, the cover portions being movable between an open position and a closed position, the first cover portion having a first aperture and the second cover portion having a second aperture, wherein the second aperture aligns with the first aperture when the cover is in the closed position; and
- a locking member interactive with the first aperture and the second aperture, the locking member including:
  - a shaft having a first end insertable into the first aperture and the second aperture;
  - a spiral flange that extends around at least a portion of the shaft; and
  - a head member at a second end of the shaft; and
  - a tool mounting member extending from the head member, the tool member having an opening.

20. The cover assembly according to claim 19, wherein an outer diameter of the spiral flange gradually increases along the shaft.

21. The cover assembly according to claim 20, wherein a smallest outer diameter of the spiral flange is at the first end of the shaft or proximate the first end of the shaft, and a largest diameter of the spiral flange is at the head member or proximate the head member.

22. The cover assembly according to claim 19, wherein the shaft includes a holding portion, wherein the spiral flange ends at a first end of the holding portion, and wherein a second end of the holding portion is proximate the head member or at the head member.

23. The cover assembly according to claim 22, wherein the first end and the second end of the holding portion are configured to contact the cover at least when the cover is in the closed position.

24. The cover assembly according to claim 19, wherein the tool mounting member comprises a ring-like member having the opening.

25. The cover assembly according to claim 24, wherein the ring-like member comprises an eyelet.

26. The cover assembly according to claim 19, wherein the first cover portion is joined to the second cover portion by at least one hinge.

27. The cover assembly according to claim 26, wherein the at least one hinge comprises a living hinge.

28. The cover assembly according to claim 26, wherein the first aperture and the second aperture are proximate the at least one hinge.

29. A cover assembly for a high-voltage electrical connector, the cover assembly comprising:

- a first cover portion joined to a second cover portion by at least one hinge, the cover portions being movable about the at least one hinge between an open position and a closed position, the first cover portion having a first aperture and the second cover portion having a second aperture, wherein the second aperture aligns with the first aperture when the cover portions are in the closed position; and
- a locking member interactive with the first aperture and the second aperture to releasably lock the first cover portion to the second cover portion, the locking member including:
  - a shaft having a first end insertable into the first aperture and the second aperture;

a spiral flange that extends at least once around at least a portion of the shaft starting at the first end of the shaft or proximate the first end of the shaft; and a head member at a second end of the shaft, the head member having a tool mounting member extending therefrom.

30. The cover assembly according to claim 29, wherein an outer diameter of the spiral flange gradually increases along the shaft.

31. The cover assembly according to claim 29, wherein at least one hinge comprises a living hinge.

32. The cover assembly according to claim 29, wherein the first aperture and the second aperture are proximate the at least one hinge.

33. The cover assembly according to claim 29, wherein the tool mounting member comprises a ring-like member having an opening.

34. The cover assembly according to claim 33, wherein the ring-like member comprises an eyelet.

35. The cover assembly according to claim 29, wherein the shaft includes a holding portion, wherein the spiral flange ends at a first end of the holding portion, and wherein a second end of the holding portion is proximate the head member or at the head member.

36. The cover assembly according to claim 35, wherein the first end and the second end of the holding portion are configured to contact the cover portions at least when the cover portions are in the closed position.

* * * * *